US012685684B2

(12) United States Patent
Yilmaz

(10) Patent No.: US 12,685,684 B2
(45) Date of Patent: Jul. 21, 2026

(54) SYSTEMS AND METHODS FOR REPOSITIONING A PATIENT

(71) Applicant: MEDIKEQUIP LLC, Tacoma, WA (US)

(72) Inventor: Hakan Yilmaz, Tacoma, WA (US)

(73) Assignee: MEDIKEQUIP LLC, Tacoma, WA (US)

( * ) Notice: Subject to any disclaimer, the term of this patent is extended or adjusted under 35 U.S.C. 154(b) by 504 days.

(21) Appl. No.: 18/185,576

(22) Filed: Mar. 17, 2023

(65) Prior Publication Data

US 2023/0320914 A1 Oct. 12, 2023

Related U.S. Application Data

(60) Provisional application No. 63/321,031, filed on Mar. 17, 2022.

(51) Int. Cl.
*A61G 7/10* (2006.01)

(52) U.S. Cl.
CPC .......... *A61G 7/1026* (2013.01); *A61G 7/104* (2013.01); *A61G 7/1074* (2013.01)

(58) Field of Classification Search
CPC ..... A61G 7/1026; A61G 7/104; A61G 7/1074
See application file for complete search history.

(56) References Cited

U.S. PATENT DOCUMENTS 1,976,244 A 10/1934 Moran
3,027,895 A 4/1962 Williams
4,526,165 A 7/1985 Mielnik et al.
4,549,540 A 10/1985 Caspari et al.
4,576,151 A 3/1986 Carmichael et al.
6,241,215 B1 * 6/2001 Gersemsky .......... A61G 7/1042 254/362
6,467,106 B1 * 10/2002 Heimbrock ........... A61G 7/103 5/81.1 HS
10,849,806 B2 12/2020 Yilmaz
11,058,594 B2 7/2021 Yilmaz
2003/0045818 A1 3/2003 Huang
2004/0050391 A1 3/2004 Kiwala et al.
2007/0000500 A1 1/2007 Richard
2016/0346147 A1 12/2016 Brown
2019/0240096 A1 * 8/2019 Yilmaz ................ A61G 7/1055

FOREIGN PATENT DOCUMENTS

WO WO-00/62721 A1 10/2000

* cited by examiner

*Primary Examiner* — Adam C Ortiz
(74) *Attorney, Agent, or Firm* — Foley & Lardner LLP

(57) ABSTRACT

System, devices, and methods for repositioning a patient from a first surface to a second surface are disclosed herein. An exemplary system can include a housing, a cartridge removably coupled to the housing, and a transfer sheet. The cartridge includes a first roller rotatably mounted along a first axis and a second roller rotatably mounted along a second axis parallel to the first axis. The transfer sheet includes a first end portion coupled to the first roller and a second end portion coupled to the second roller. The transfer sheet has a fold defining a top layer between the fold and the first end portion and a bottom layer between the fold and the second end portion. The top layer is configured to contact the patient, and the bottom layer is configured to contact the first surface and the second surface.

10 Claims, 30 Drawing Sheets

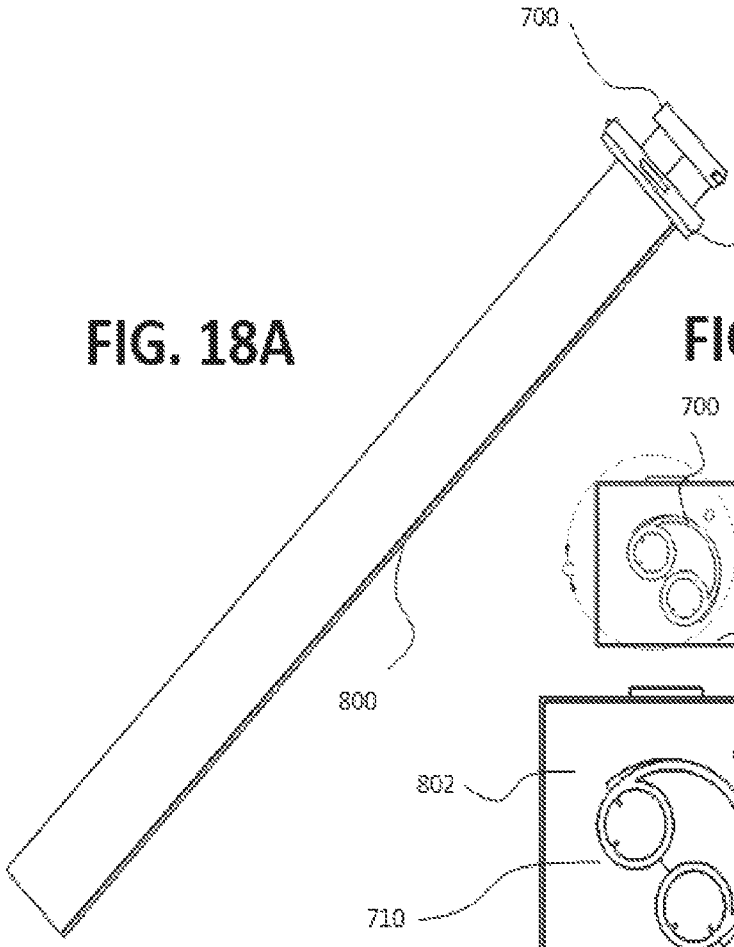
FIG. 18A
FIG. 18B
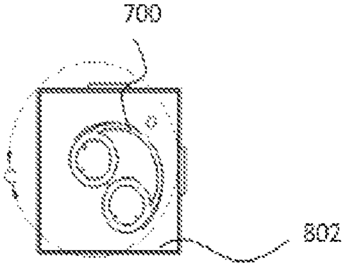
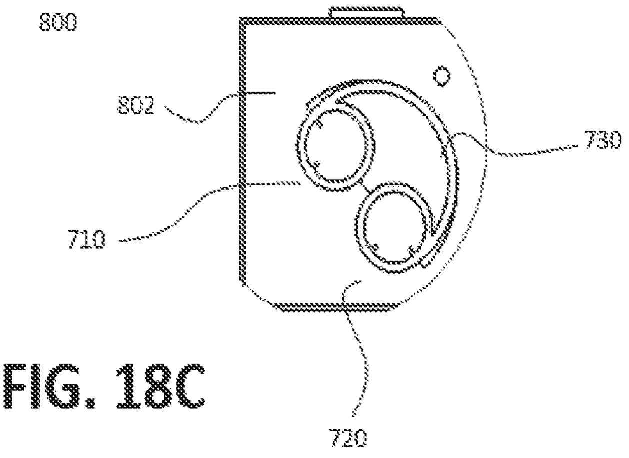
FIG. 18C

FIG. 19A
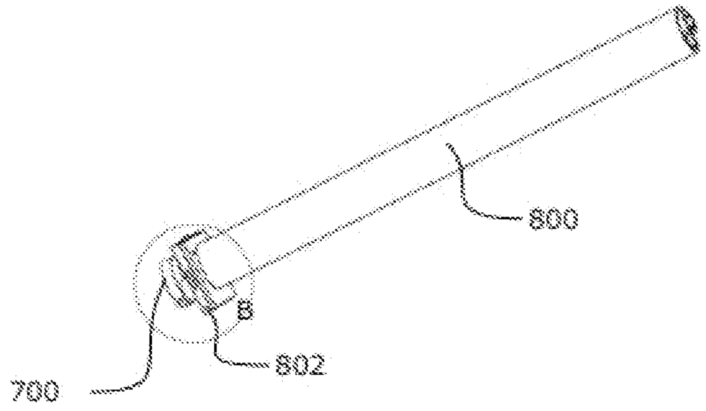
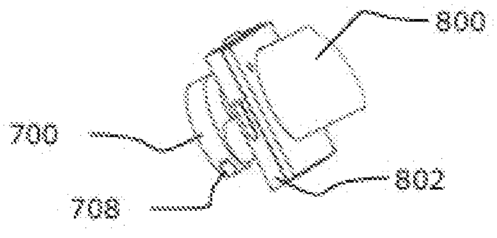
FIG. 19B

FIG. 20C
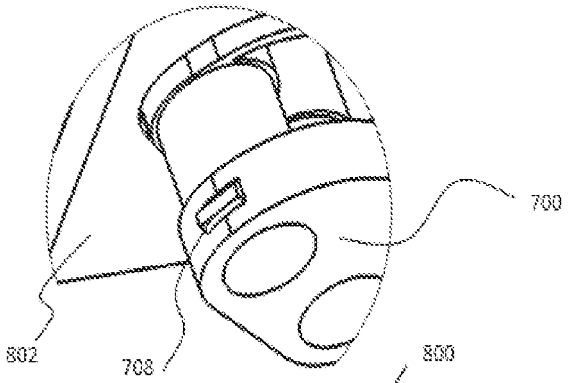
FIG. 20A
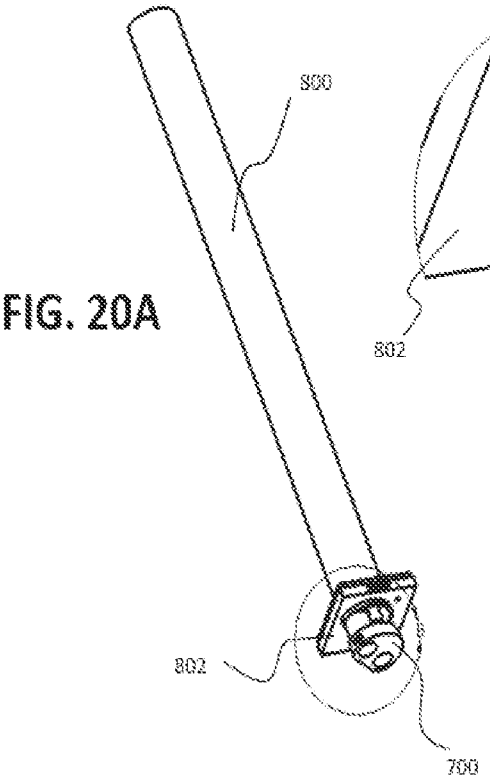
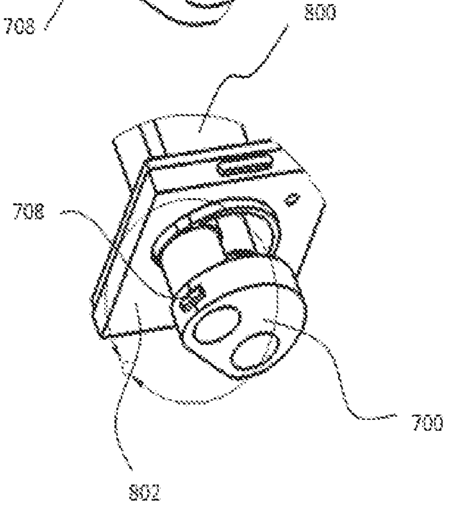
FIG. 20B

FIG. 22
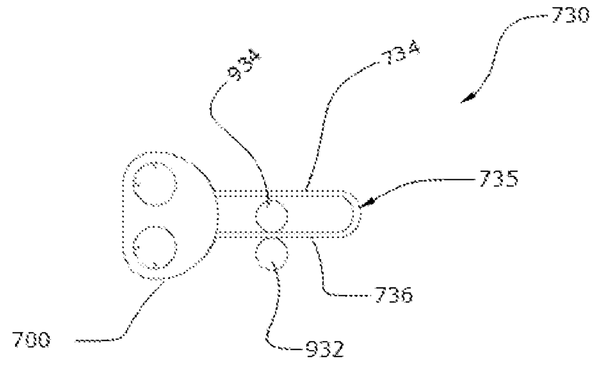
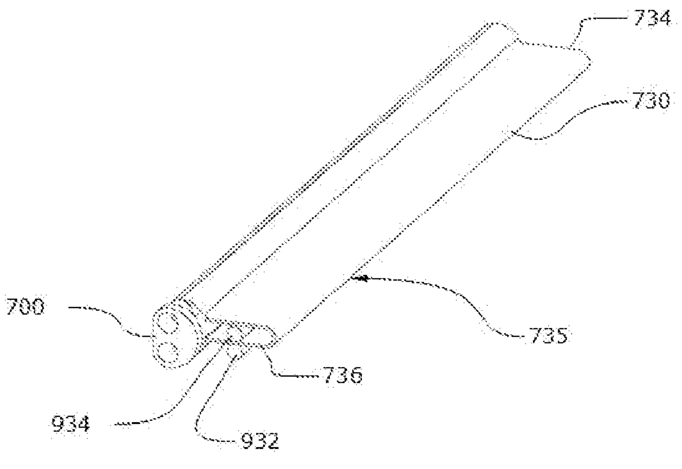
FIG. 23

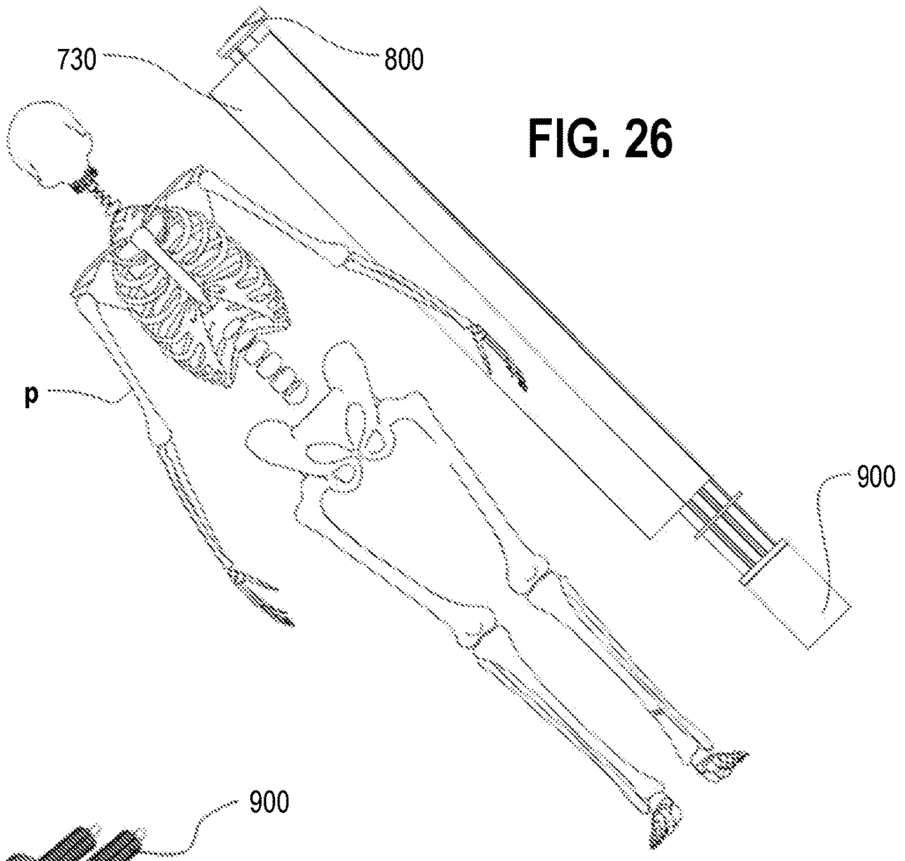
FIG. 26
FIG. 27B
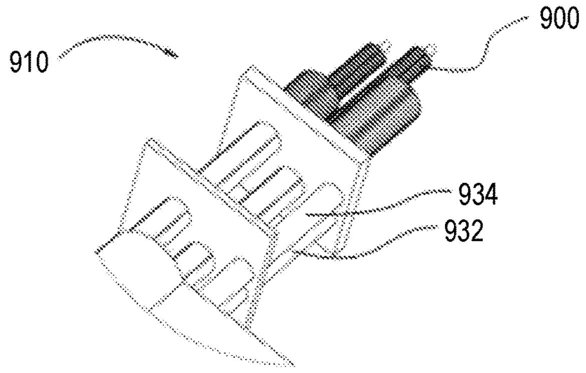
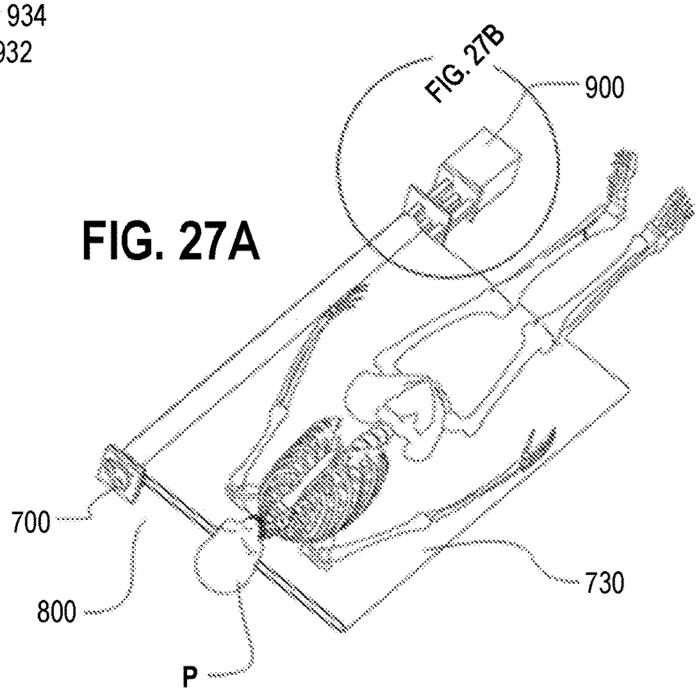
FIG. 27A

FIG. 28B
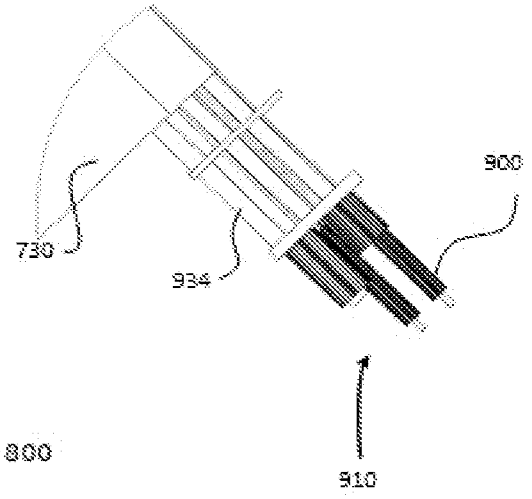
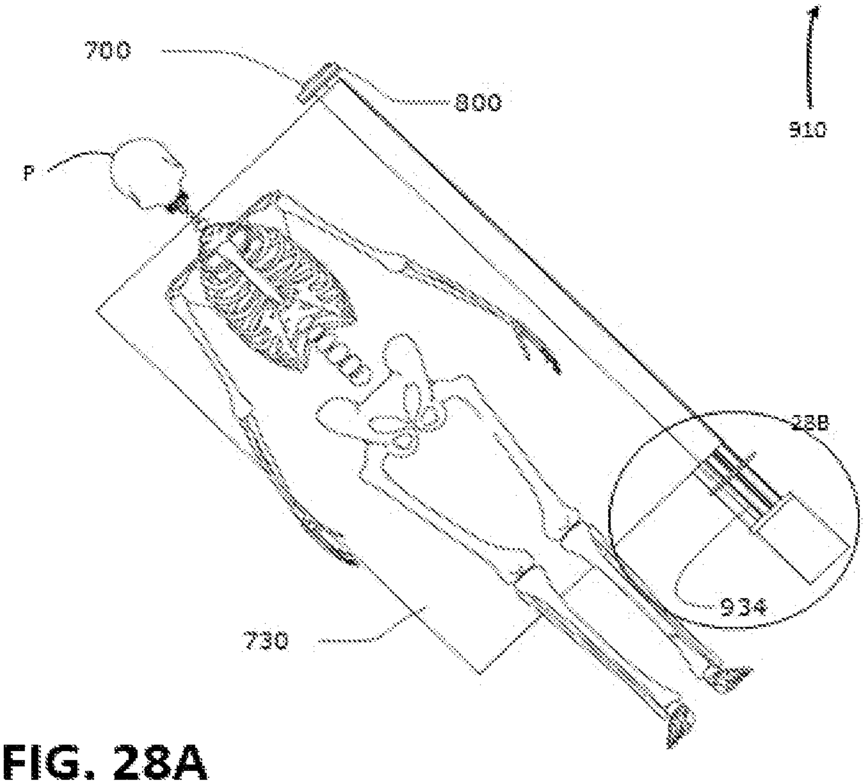
FIG. 28A

FIG. 29A
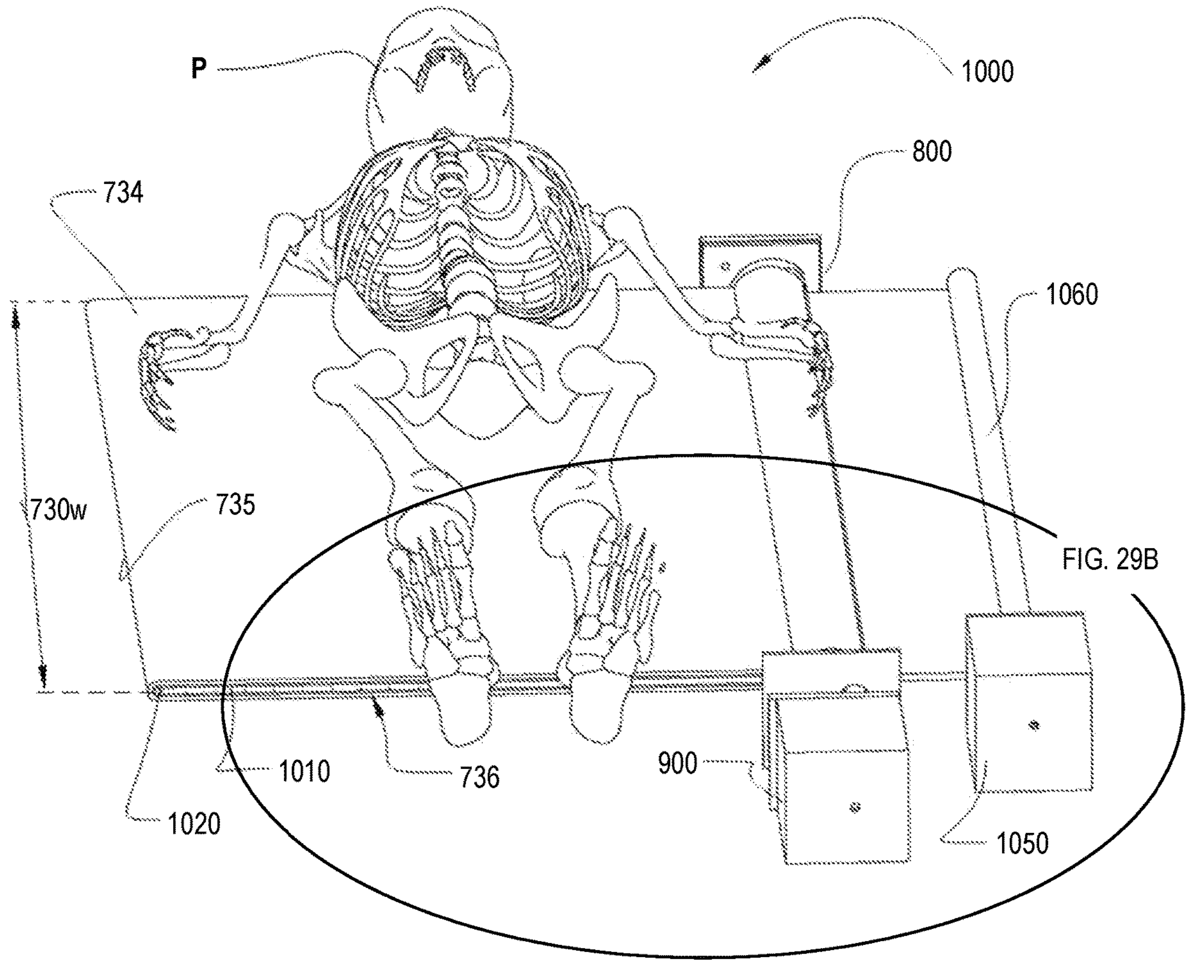
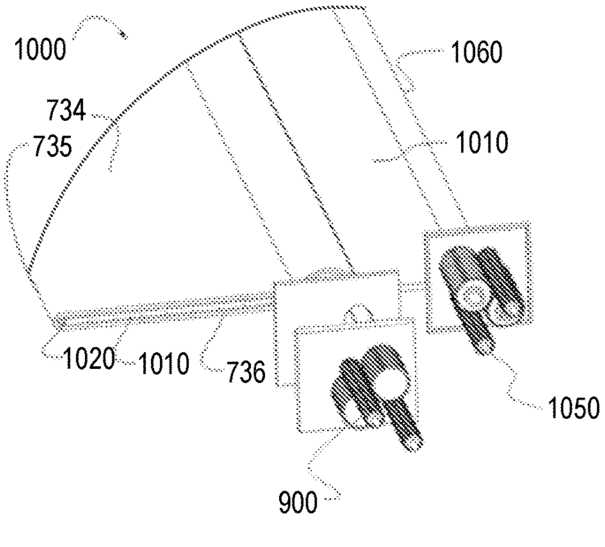
FIG. 29B

FIG. 30A
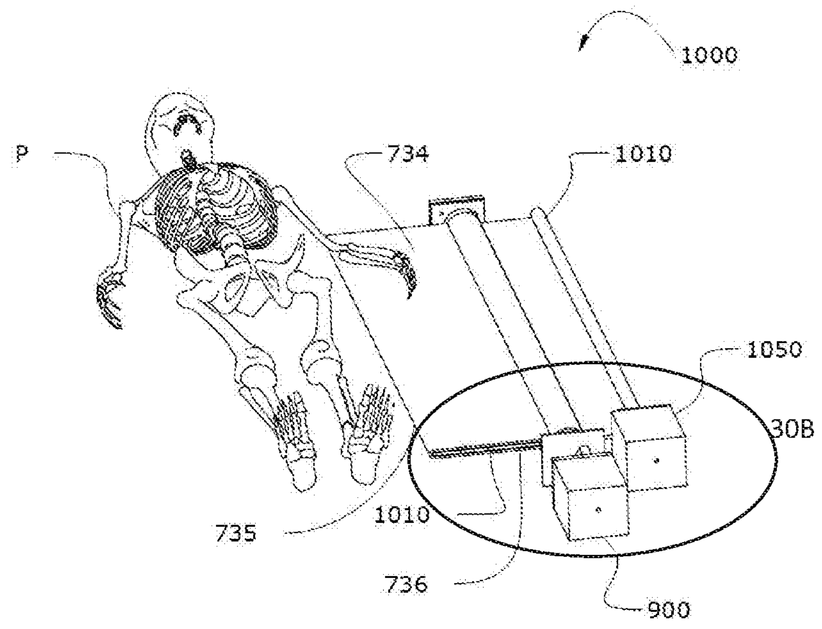
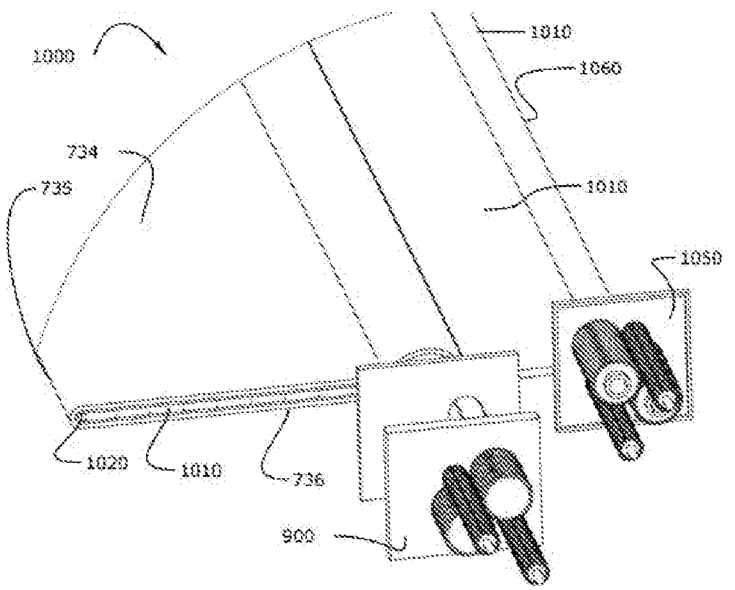
FIG. 30B

SYSTEMS AND METHODS FOR REPOSITIONING A PATIENT

CROSS-REFERENCE TO RELATED APPLICATIONS

The present application claims the benefit of U.S. Provisional Patent Application No. 63/321,031 filed Mar. 17, 2022, the disclosure of which is incorporated herein by reference in its entirety.

TECHNICAL FIELD

This present disclosure relates to systems and methods for conveniently repositioning a patient on a bed or for transferring a patient from a bed to another platform (e.g., another bed, a gurney, a wheelchair, etc.).

BACKGROUND

A patient may be repositioned on a hospital bed by placing a slide sheet between the patient and the hospital bed and sliding the slide sheet across the hospital bed. Typically, slide sheets can be placed under a patient by rolling the patient on their side, placing a first portion of the sheet under the patient, and then rolling the patient on their other side to pull the rest of the sheet under the patient. The patient may then be moved across a hospital bed or from one bed to another by moving the slide sheet relative to the hospital bed. Known slide sheet systems are inconvenient and present a number of hygiene-related challenges for healthcare workers. As such, a need persists for improved systems and methods for repositioning a patient.

BRIEF DESCRIPTION OF THE DRAWINGS

Features, aspects, and advantages of the presently disclosed technology may be better understood with regard to the following drawings.

FIG. 18A shows a perspective view of the slide sheet cartridge of FIG. 17.

FIG. 18B shows an end view of the slide sheet cartridge of FIG. 18A.

FIG. 18C shows an enlarged view of a portion of the end view of FIG. 18B.

FIG. 19A shows a perspective view of the slide sheet cartridge of FIG. 17.

FIG. 19B shows an enlarged view of a portion of the perspective view of FIG. 19A.

FIG. 20A shows a perspective view of the slide sheet cartridge of FIG. 17.

FIG. 20B shows an enlarged perspective end view of the view of FIG. 20A.

FIG. 20C shows an enlarged view of a portion of the perspective view of FIG. 20B.

FIG. 22 shows an end view of the slide sheet cartridge of FIG. 17 with the slide sheet partially extended.

FIG. 23 shows a perspective view of the slide sheet cartridge of FIG. 22.

FIG. 26 shows a top view of the view of FIG. 25.

FIG. 27A shows a perspective view of the arrangement shown in FIG. 25 with the slide sheet fully extended beneath the patient.

FIG. 27B shows a cutaway perspective view of a motorized gearbox suitable for use with a slide sheet cartridge consistent with one embodiment of the present disclosure.

FIG. 28A shows a top view of the arrangement shown in FIG. 27A.

FIG. 28B shows a top cutaway view of the motorized gearbox of FIG. 27B.

FIG. 29A shows a perspective view of a patient repositioning system including an extendable transfer sheet insertion assistance module configured in accordance with embodiments of the present disclosure.

FIG. 29B shows an enlarged partial cutaway perspective view of a portion of the view of FIG. 29A.

FIG. 30A shows a perspective view of a patient repositioning system including an extendable transfer sheet insertion assistance module configured in accordance with embodiments of the present disclosure.

FIG. 30B shows an enlarged partial cutaway perspective view of a portion of the view of FIG. 30A.

Figure 1:
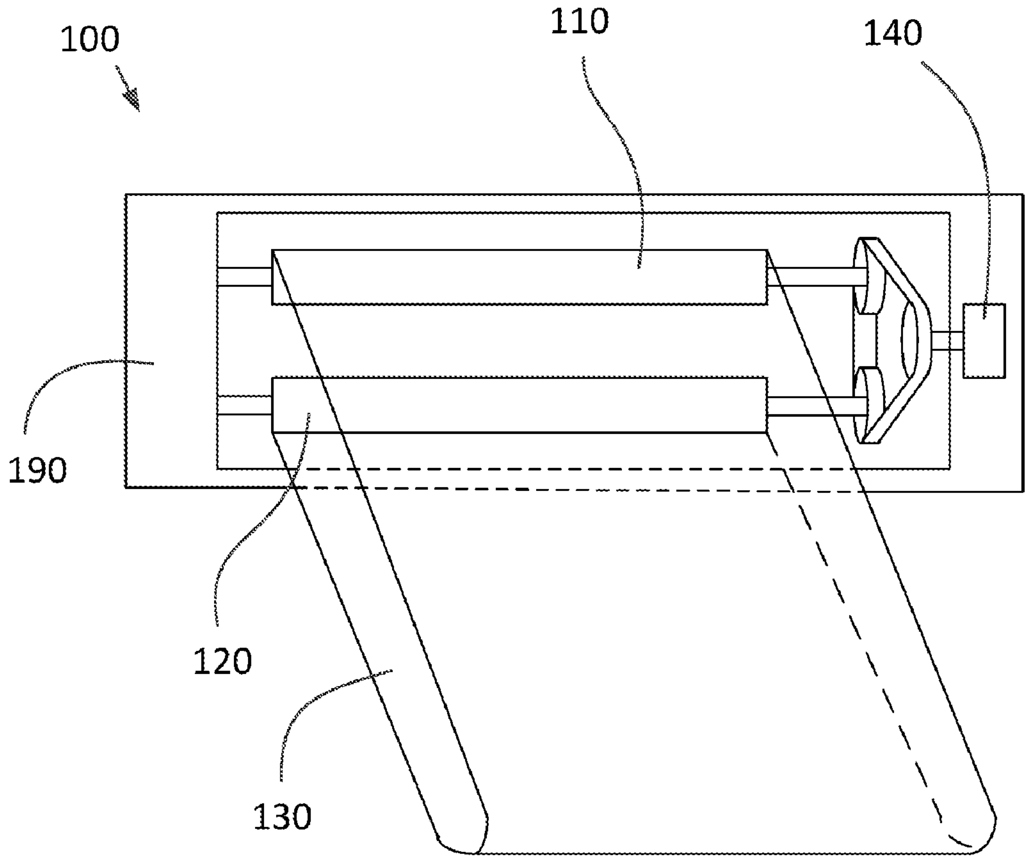
FIG. 1 shows a perspective view of a patient transfer apparatus configured in accordance with embodiments of the present disclosure.

A person skilled in the relevant art will understand that the features shown in the drawings are for purposes of illustrations, and variations, including different and/or additional features and arrangements thereof, are possible.

DETAILED DESCRIPTION

The present disclosure provides systems, devices, assemblies, and methods for repositioning a patient. For instance, a user of the system (e.g., a healthcare provider) may desire to reposition a patient on a transfer surface (e.g., a hospital bed), move a patient across a transfer surface, or move a patient from one surface to another. It could be beneficial to provide a system which facilitates portions of this patient transfer process. Such systems may allow a physician to move a patient across a transfer surface with less force, in less time, with fewer personnel, with less risk of injury, or with some other benefit such as improved hygiene and reduced equipment setup time/error rate.

The present disclosure attempts to meet such needs by enabling users to conveniently reposition a patient on a single surface or from one surface to another surface. The present disclosure generally relates to a retractable sheet for moving a patient from a first position to a second position. The system could comprise an apparatus including two rollers and a transfer sheet, which can be positioned adjacent to a transfer surface. Opposite ends of the transfer sheet could be attached to first and second rollers, such that the sheet may be wound around either the first and/or second roller and unwound around the other roller. Additionally, the sheet can be unwound from both the first and second rollers. When the sheet is unwound from the two rollers and pulled across the transfer surface and under a patient, the transfer sheet forms a top layer and a bottom layer. The material that forms the transfer sheet can be designed to reduce friction between the two layers of the sheet, allowing the patient to be moved across the transfer surface by sliding the top layer against the bottom layer of the sheet. In some examples, repositioning the patient involves retracting the top layer of the transfer sheet around the first roller, thereby moving the patient in a direction toward the apparatus. Additionally or alternatively, the transfer sheet could be configured to receive air into one or more chambers in the sheet, and the patient could be turned or otherwise repositioned by inflating at least a portion of the transfer sheet. Because of the sheet's reduced-friction properties, the sheet can then be removed from under the patient with ease by retracting the remaining portion of the sheet around the second roller.

The proposed configuration of embodiments of the present disclosure make the process of moving a patient more convenient by arranging the transfer sheet in an apparatus near a hospital bed, stretcher, gurney, or a similar transfer surface. Similarly, winding the transfer sheet around two rollers may make it easier to pull the sheet under the patient, move the patient in the direction of the roller by retracting the sheet around the roller(s), and store the sheet when not in use. In some examples, the apparatus may further provide a motor for powering the retraction or unwinding of the transfer sheet, allowing a physician or other medical personnel to reposition a patient with less force, in less time, with fewer personnel, or with reduced risk of injury. The double layered design may also provide the advantage of reducing friction when the patient is moved, facilitating the process of placing the sheet under the patient and sliding the patient across the transfer surface. Other implementations and advantages are envisioned by one of ordinary skill in the art.

FIG. 1 illustrates a perspective view of a patient transfer assembly or apparatus 100 configured in accordance with embodiments of the present disclosure. The patient transfer apparatus 100 includes a first roller 110 and a second roller 120, which may be mounted or held within a housing 190. A transfer sheet 130 is wound around at least one of the first 110 and/or second 120 rollers, such that it may be wound around one roller and unwound around the other roller. In some embodiments, the patient transfer apparatus 100 includes a motor 140, which may be coupled to and/or configured to operate the first 110 and/or second 120 rollers.

The first and second rollers 110, 120 could be any elements configured to move rotationally around an axis such that the transfer sheet 130 may be wound around a roller by rotating the roller around its axis. The rollers 110, 120 may each be configured to rotate both clockwise and counterclockwise, independent of one another, in order to both wind and unwind the transfer sheet 130. A dimension of the rollers 110, 120 may be greater than or substantially equal to a corresponding dimension of the transfer sheet 130. The first 110 and second 120 rollers can be arranged at or near one side (i.e., the same side) of a transfer surface, so that, when the transfer sheet 130 is wound around the rollers 110, 120, the transfer sheet 130 can be retracted to the one side of the transfer surface and away from an area of the transfer surface on which a patient may be positioned. The first roller 110 may be vertically spaced apart from (i.e., disposed above) the second roller 120, such that, when the sheet 130 is unwound from the first 110 and/or second 120 rollers and pulled across the transfer surface to form or define a top layer and a bottom layer of the transfer sheet 130, the top layer is coupled to the first roller 110, and the bottom layer is coupled to the second roller 120. A gap could be provided between the first 110 and second 120 rollers to allow access to a portion of the transfer sheet 130 between the rollers (e.g., to allow a user of the apparatus to pull the portion of transfer sheet to unwind it from the rollers).

The rollers 110, 120 could be held within a housing 190. The first roller 110 and the second roller 120 could be coupled to the housing 190 at their respective axes, such that the position of each roller is fixed in space relative to the other roller, but they may each rotate on their axes independently.

The transfer sheet 130 includes a first end (e.g., first end portion) and a second end (e.g., second end portion) opposite the first end. in some examples, the first end could be coupled to the first roller 110 and the second end opposite the first end could be coupled to the second roller 120 such that the transfer sheet 130 can be wound around one roller and unwound around the other roller. For example, the transfer sheet 130 can be wound around the first roller 110 while being unwound from the second roller 120, or the transfer sheet 130 can be wound around the second roller 120 while being unwound from the first roller 110. Further, the transfer sheet 130 can be wound around and/or unwound from both the first 110 and second 120 rollers at the same time.

The transfer sheet 130 could be approximately the size of a standard slider sheet. In another example, the transfer sheet 130 could have a width approximately the size of a standard slider sheet and a length double the length of a standard slider sheet, such that, when the transfer sheet 130 is unwound from the rollers 110, 120 and folded over on itself to form a top and bottom layer, the transfer sheet 130 is approximately the size of a standard slider sheet. Depending on the application, size of the patient, and size of the transfer surface, a range of dimension and sizes of the transfer sheet could be envisioned.

The transfer sheet 130 could be configured or designed to have reduced friction, increased water resistance, "breathability", durability, reduced noise during use, or other favorable material properties. In order to facilitate repositioning of the patient, the transfer sheet 130 could be comprised of a low-friction material or a low-friction surface coating. This may make it easier to slide one layer of the transfer sheet 130 against another layer, allowing a user of the apparatus 100 to move a patient with less force, fewer personnel, reduced risk of injury, in less time, or with some other advantage. The transfer sheet 130 could be made from a variety of materials, including but not limited to nylon, polypropylene, or other polymeric materials. A surface of the transfer sheet 130 could further comprise a surface coating, e.g., a coating that reduces friction, protects the sheet from wear, adds water resistance, improves the durability or flexibility of the sheet, or provides some other benefit A surface coating could be applied to multiple surfaces of the transfer sheet 130, or only to one side of the transfer sheet (e.g., an inward side of the transfer sheet that will be in contact with and slide against itself when the top layer slides against the bottom layer). In one example, the surface could be coated with silicone.

In some examples, the transfer sheet 130 could include an outer trim or hem to prevent fraying and increase durability, or for some other benefit. Additionally or alternatively, the transfer sheet 130 could include handles to facilitate unwinding or winding around the rollers 110, 120, to facilitate repositioning of the patient, or for some other purpose. The handle(s) could be disposed at an outer edge of the transfer sheet 130, for example, along a hem of the transfer sheet. Additionally or alternatively, handle(s) could be disposed at a midpoint of the transfer sheet 130 (i.e., at a point between the first end and the second end of the transfer sheet, or a point disposed between the first 110 and second 120 rollers when the transfer sheet is fully retracted). In such a case, the handles could be pulled to unwind the transfer sheet 130 from the first 110 and/or second 120 rollers.

The transfer sheet 130 could also include one or more chambers formed in the transfer sheet 130 and configured to receive a gas (e.g., air), such that at least a portion of the transfer sheet 130 can be inflated. The one or more chambers could be formed by providing a further layer of the transfer sheet material adhered to the transfer sheet 130 to form an airtight seal between the transfer sheet and the further layer. Such chambers could be formed in the top layer of the transfer sheet and/or the bottom of the transfer sheet, and could take any desired shape including, e.g., longitudinal channels or pockets in any shape or combination of shapes. In a particular example, the transfer sheet 130 includes a left side chamber and a right-side chamber formed such that they are disposed approximately beneath a patient positioned on the transfer sheet (i.e., so inflating the left- and/or right-side chamber causes the patient to be lifted on their left and/or right side, respectively). In such examples, the transfer sheet 130 could also include one or more entrance ports (e.g., grommets or eyelets) in fluid communication with the one or more chambers, such that air that enters through an entrance port is directed into one or more corresponding chambers The transfer sheet 130 could be configured to be a single-use sheet (i.e., used for a single repositioning of a single patient) or could be used for multiple repositionings of the same patient (i.e., single-patient use). Such a transfer sheet 130 could be configured to be disposable and/or recyclable. Additionally or alternatively, the transfer sheet 130 could be configured for use on a plurality of patients, and the transfer sheet 130 could be cleaned or washed between uses or between patients.

To facilitate removal of the transfer sheet 130 (e.g., to replace a used transfer sheet with a new sheet), the transfer sheet 130 could be detachable from the first and/or second rollers 110, 120. In such an example, a first end of the transfer sheet 130 may be removably coupled to the first roller 110, while the second end of the transfer sheet may be removably coupled to the second roller 120. Removably coupling of the transfer sheet 130 could include coupling the transfer sheet to the first 110 and/or second 120 rollers with a hook and loop attachment (e.g., Velcro brand), an adhesive, a hook, a clamp, a tie, or some other means for reversible coupling.

Additionally or alternatively, replacing the transfer sheet 130 could include replacing the first and/or second rollers 110, 120 of the apparatus 100. In such a configuration, the transfer sheet 130 could be designed or sold pre-wound onto a roller, such that replacing the sheet 130 comprises removing an existing roller on which the transfer sheet 130 is wound, and coupling a new roller containing a new transfer sheet to the apparatus 100. If, for example, the second roller 120 comprises the replacement transfer sheet, replacing the transfer sheet 130 could include coupling a new second roller to the housing. Replacing the transfer sheet 130 could further include coupling a free end of the transfer sheet (e.g., a first end or a second end) to the other roller (in this scenario, the first roller 110), thereby allowing the new transfer sheet 130 to be unwound from the second roller 120 and wound around the first roller 110. The reverse configuration is also possible, wherein replacing the transfer sheet 130 comprises removing an existing first roller 110, coupling a new first roller comprising a new transfer sheet to the apparatus 100, and attaching a free end of the new transfer sheet to the second roller 120. Other configurations are envisioned by one with ordinary skill m the art.

Figure 2:
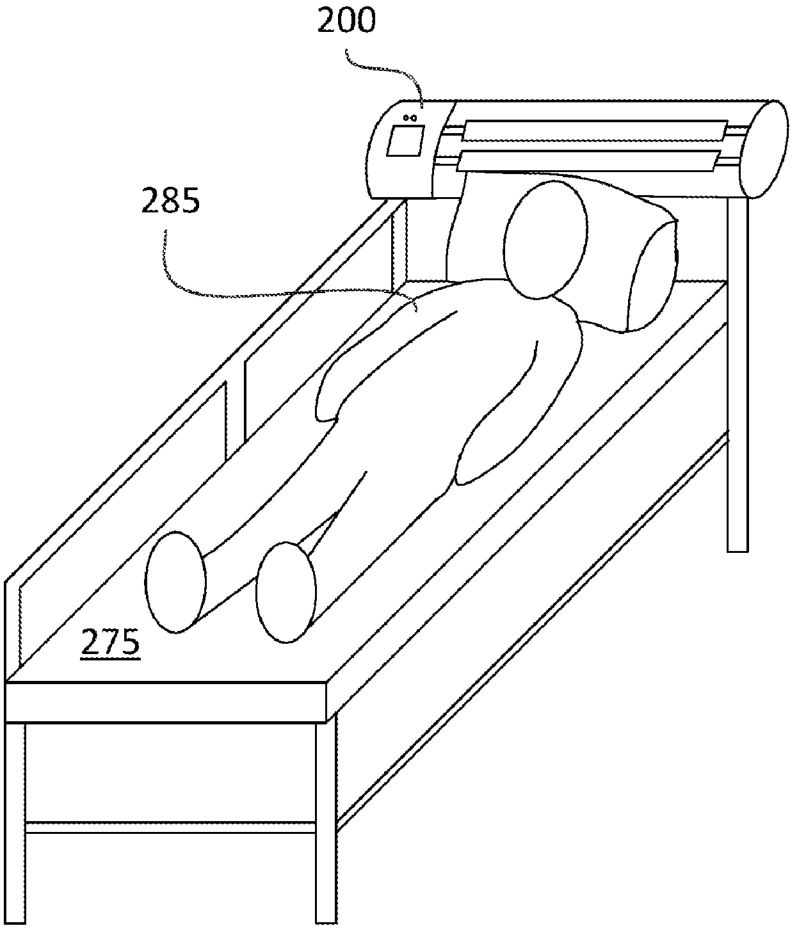
FIG. 2 shows a perspective view of a patient transfer apparatus associated with a patient bed configured in accordance with embodiments of the present disclosure.

FIG. 2 illustrates a patient transfer apparatus 200 positioned proximate to a patient 285 positioned on a transfer surface 275 and configured in accordance with an embodiment of the present disclosure. The patient transfer apparatus 200 depicted in FIG. 2 can be similar to or the same as the patient transfer apparatus 100 depicted in FIG. 1. The transfer surface 275 could be, for instance, the top surface of a patient bed, a hospital bed, a stretcher, a full-body imaging system, or the like. The apparatus 200 could be positioned relative to the transfer surface 275 to facilitate unwinding of the transfer sheet across the transfer surface 275 and/or repositioning of the patient 285 on the transfer surface 275. For instance, the apparatus 200 could be positioned such that the first and/or second roller is approximately the same height relative to the transfer surface 275, higher than the transfer surface 275, or lower than the transfer surface, according to the particular application. Positioning the apparatus 200 proximate to the transfer surface 275 could include detachably coupling the apparatus 200 to a side of the transfer surface (e.g., a patient bed or another like surface on which the patient 285 is positioned). Detachably coupling, as described herein, could mean positioning or securing the apparatus 200 proximate to the transfer surface 275 such that it is substantially stable during use, but can be later removed (e.g., in order to reposition the apparatus 200 proximate a different transfer surface). To facilitate positioning of the patient transfer apparatus 200, the housing or another element of the apparatus 200 could include an attachment mechanism. For example, the patient transfer apparatus 200 could include one or more clamps, hook and loop fasteners, ties, or other means for attachment. In a particular example, positioning the patient transfer apparatus proximate to the transfer surface comprises securing the apparatus with a clamp.

In another embodiment, the patient transfer apparatus 200 could be disposed on a stand (e.g., a wheeled stand, a tripod, or another support) and positioning the apparatus proximate to the patient 285 positioned on the transfer surface 275 could include placing or rolling the stand proximate to the transfer surface 275. Additionally or alternatively, the patient transfer apparatus 200 could be disposed on an armature (e.g., an armature coupled to the transfer surface 275, or a different device) and positioning the apparatus 200 could include moving the armature proximate to the patient 285 and/or transfer surface 275.

In some cases, the patient transfer apparatus 200 may form part of a system comprising the transfer surface 275 or be irreversibly coupled to the transfer surface 275. For example, a patient bed, a hospital bed, a stretcher, or another like surface could be designed to include the patient transfer apparatus 200, disposed at an appropriate location relative to the patient 285 and transfer surface 275. In such an example, positioning the patient transfer apparatus 200 proximate to the patient 285 could include positioning the patient transfer apparatus 200 on the transfer surface 275.

Figure 3A:
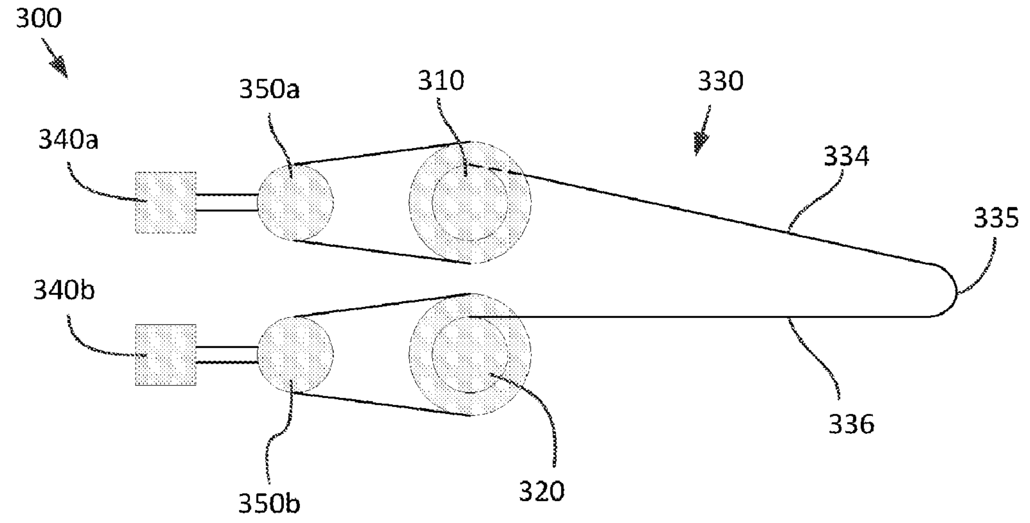
FIG. 3A shows a sectional view of a patient transfer apparatus configured in accordance with embodiments of the present disclosure.
Figure 3B:
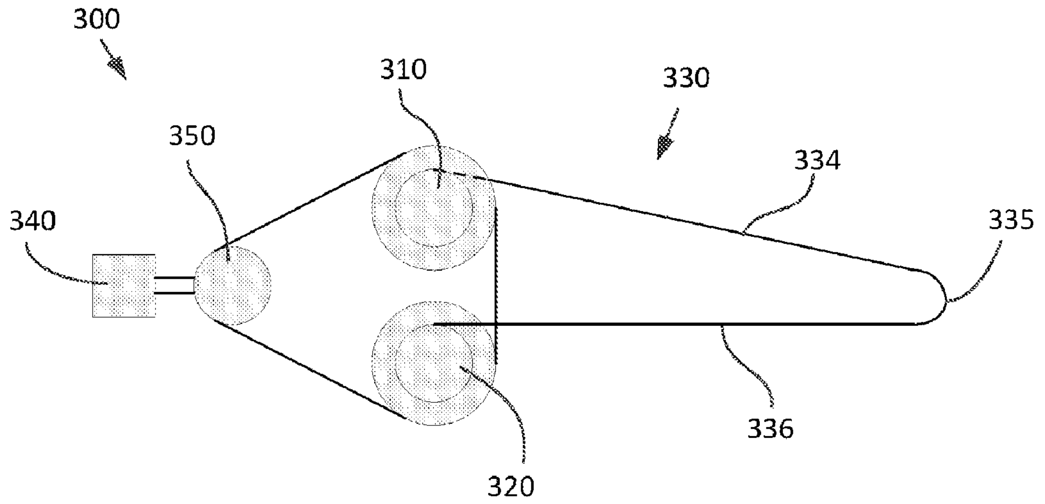
FIG. 3B shows a sectional view of a patient transfer apparatus configured in accordance with embodiments of the present disclosure.
Figure 3C:
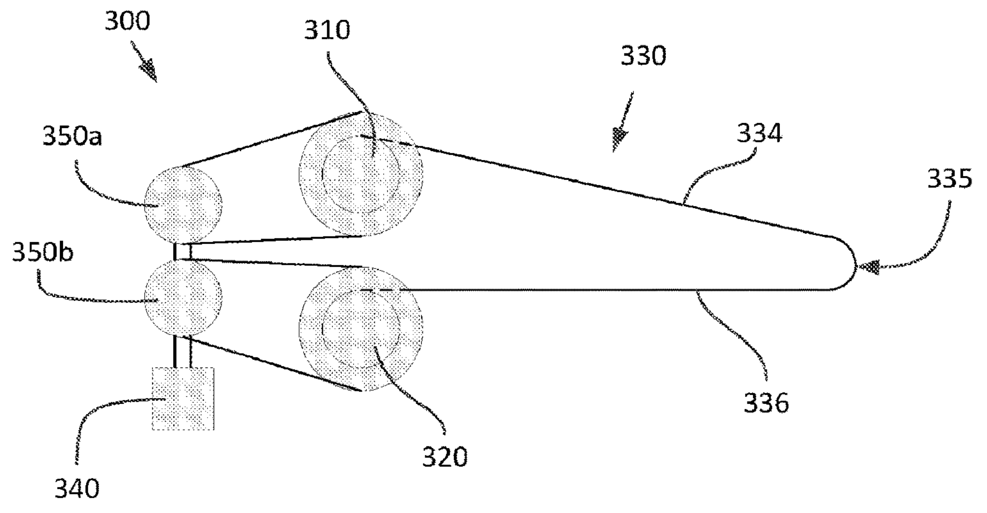
FIG. 3C shows a sectional view of a patient transfer apparatus configured in accordance with embodiments of the present disclosure.

Once the apparatus 200 is positioned proximate to the patient 285, the transfer sheet can be unwound from rollers. FIGS. 3A-C illustrate a few non-limiting examples of a patient transfer apparatus 300, according to the present disclosure, shown with the transfer sheet at least partially unwound from rollers 310, 320. With the two rollers 310, 320 disposed on one side of the transfer surface, unwinding the sheet 330 from the first and/or second rollers while the ends of the sheet remain attached to the rollers can result in the formation of two layers on the transfer surface. In a particular example, unwinding the transfer sheet 330 from the second roller 320 may cause the transfer sheet to form a top layer 334 and a bottom layer 336 beneath the patient and between the patient and the transfer surface. Unwinding the transfer sheet 330 from the second roller 320 could comprise sliding the bottom layer 336 of the transfer sheet between the transfer surface and the top layer 334 of the transfer sheet. When unwound, the top layer 334 and bottom layer 336 may be joined at a fold 335 at, e.g., the end of the transfer surface opposite the apparatus 300.

The top and bottom 334, 336 layers could be configured to slide against each other with low or reduced friction. The reduced friction between the layers 334, 336 of the transfer sheet 330 is expected to allow a user of the apparatus 300 to move or reposition a patient with reduced effort. In one embodiment, a physician or user of the device 300 could slide the top layer 334 of the transfer sheet against the bottom layer 336 of the transfer sheet to manually move the patient in whatever desired direction (e.g., in a similar manner as a standard slider sheet). Moving or repositioning the patient toward the patient transfer apparatus 300 could be facilitated by winding the transfer sheet 330 around the first roller 310. In some examples, winding the transfer sheet 330 around the first roller 310 may move the patient in a direction toward the first roller 310.

Figure 6:
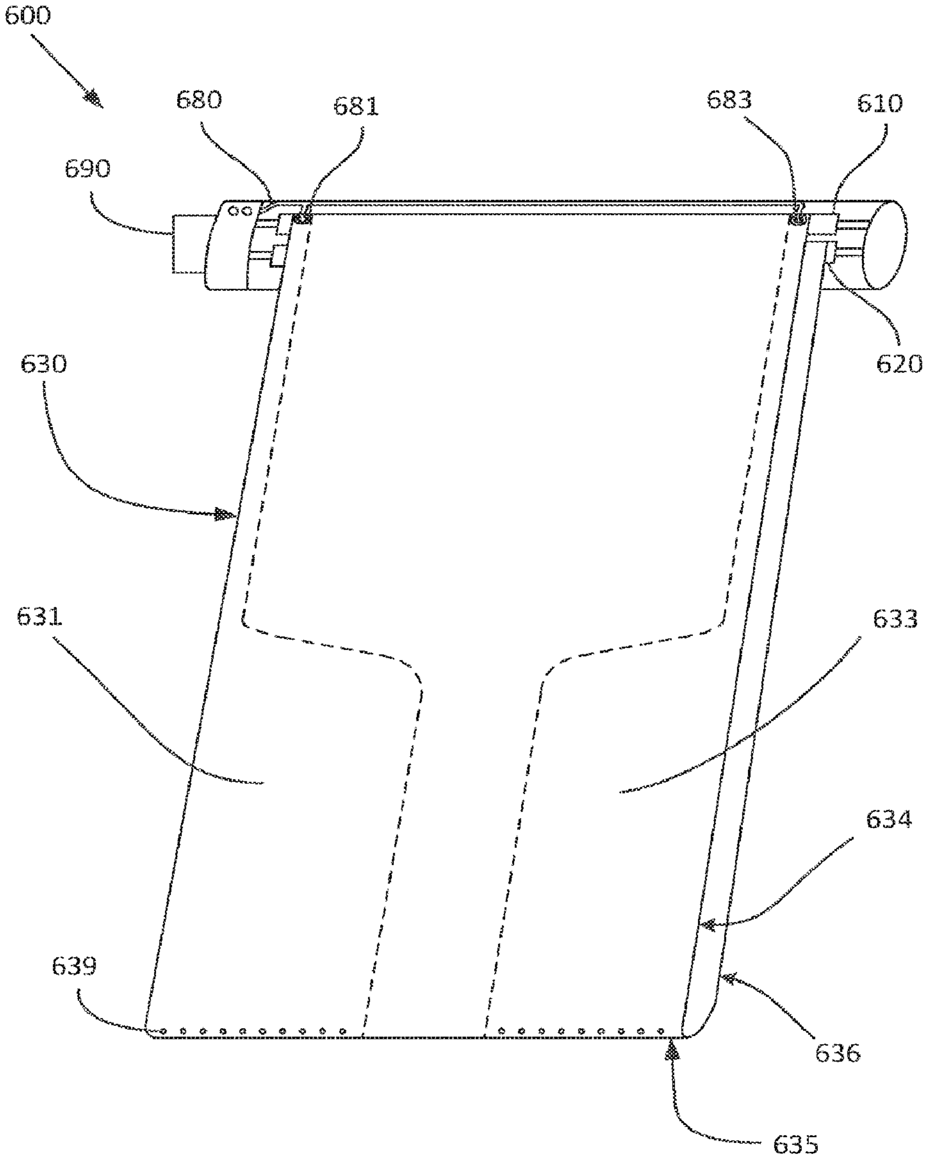
FIG. 6 shows a perspective view of a patient transfer apparatus configured in accordance with embodiments of the present disclosure.

In some examples, a patient may additionally be repositioned by inflating at least a portion of the transfer sheet. Inflating a portion of the transfer sheet could cause a patient positioned on the sheet to be lifted, turned, or otherwise moved in order to, e.g., facilitate the changing of bedding or the repositioning of the patient on the patient bed. FIG. 6 illustrates an example patient transfer apparatus 600, including an inflatable transfer sheet 630 with chambers 631, 633, and an air compressor 690 configured to direct air into the chambers 631, 633 of the transfer sheet 630. As seen in FIG. 6, the transfer sheet 330 may be made inflatable (i.e., capable of receiving air or another gas) by providing chambers (e.g., 631, 633), pockets, channels, and/or additional layer(s) of transfer sheet material along at least a portion of the top layer 634 or bottom layer 636 of the transfer sheet 630 thereby forming an airtight volume within the sheet 630. In a particular example, the top layer 634 of the transfer sheet comprises a further layer of the transfer sheet material adhered (e.g., melted, sewn, or attached by way of an adhesive) to the top layer 634 so as to form airtight chambers 631, 633 configured to receive air between the top layer 634 and the further layer.

The chambers 631, 633 in the transfer sheet 630 could be formed in a variety of shapes, for instance, in channels, pockets, or any other desired shape or combination of shapes. In order to facilitate lifting and repositioning of the patient, in certain cases the chambers 631, 633 may take a shape that most optimally positions the air beneath the patient or a portion of the patient. For instance, the chambers 631, 633 could be formed in the transfer sheet 630 at a location that is approximately under a patient's hips when the transfer sheet 630 is fully retracted beneath the patient. Longitudinal channels may be provided in the transfer sheet (e.g., longitudinal channels running along an edge or edges of the sheet) to direct the air from an entrance port(s) 681, 683 of the sheet 630 to the one or more chambers 631, 633 in the transfer sheet 630.

In some cases, the airtight chamber includes a left side chamber 631 and a right side chamber 633 which may be inflated independently, such that a patient can be controllably lifted on their right or left side, i.e., to facilitate turning of the patient. The left side 631 and right side 633 chambers may be formed in any desired shape, and may take the same or different shapes. For instance, the left side chamber 631 and right side chamber 633 could include approximately "b" and "d" shaped chambers, respectively. Such chambers 631, 633 could include respective longitudinal channels extending from respective entrance ports 681, 683 and leading to larger pockets disposed approximately under a patient's hips, back, or legs. However, one of ordinary skill in the art would readily understand that a chamber or chambers could be provided in the transfer sheet 630 in any desired shape so as to locate air beneath the patient to help with repositioning the patient.

In order to inflate the transfer sheet 630, air may be forced into the sheet 630 using an air compressor 690 or another means for forcing air into the chambers 631, 633 in the transfer sheet 630. In some cases, compressed air or another compressed gas (e.g., nitrogen gas) may be forced into the transfer sheet 630 from a pressurized tank including a regulator configured to regulate the pressure flow of the gas, the gas flow' rate, or some other parameter. Air or another gas could enter the sheet through at least one entrance port 681, 683, for instance, a grommet, and/or eyelet disposed in the sheet and configured to form an air tight seal with a conduit 680. The entrance port(s) 681, 683 could be disposed anywhere on the transfer sheet 630, but may preferably be disposed near the end of the transfer sheet 630 that is coupled to the first roller 610 and/or second roller 620 of the patient transfer apparatus 600. In examples including a plurality of chambers 631, 633, there may be a corresponding number of entrance ports 681, 683 leading to the respective chambers (e.g., a first entrance port 681 leading to a left side chamber 631 and a second entrance port 683 leading to a right side chamber 633). An airtight conduit 680 may be provided between the compressor 690 and the entrance port(s) 681, 683 such that gas may flow from the compressor 690, through the conduit 680, and into the entrance port(s) 681, 683 of the transfer sheet 630 The conduit 680 may be disposed in any desired location, for instance, inside a housing of the device 600, inside the first 610 or second 620 rollers or an axle thereof, at a location outside of the housing of the device or distal to the device, or in some other location.

Air may leave the chamber(s) 631, 633 in the transfer sheet 630 by way of one or more holes 639 disposed in the one or more chambers 631, 633 of the transfer sheet 630. The hole(s) 639 may be sized such that air leaves the chambers 631, 633 in the transfer sheet 630 at approximately the same rate that air enters the chambers via the entrance ports 681, 683, i.e., at the same rate the air compressor 690 forces the air into the transfer sheet 630, such that a steady state of inflation is maintained in the sheet. The holes 639 should be located such that air forced into the transfer sheet 630 must pass at least partially under the patient, thereby inflating the portion of the sheet under the patient, before exiting the sheet 630 through the holes 639. Depending on the size and configuration of the chambers 631, 633, the holes may be located at any desired location on the transfer sheet 630. For example, the holes 639 may be located on the bottom layer of the sheet 636, at approximately the location of a fold 635 of the transfer sheet (i.e., where the top 634 and bottom 636 layer of the sheet meet), on the top layer of the sheet 634, or at some other location that comprises part of one or more of the chambers 631, 633. In examples where the chambers 631, 633 are formed by a further layer of transfer sheet material adhered to the top layer 634 and/or bottom layer 636, the holes 639 could be located on the further layer of the transfer sheet 630.

Returning to FIGS. 3A-C, after repositioning the patient manually and/or by way of inflation, the transfer sheet 330 can be retracted from underneath the patient and removed from the transfer surface. Retracting the transfer sheet 330 may include winding an amount of the transfer sheet (e.g., the top 334 and/or bottom 336 layers of the sheet) around the first 310 and/or second 320 rollers. In one example, the bottom layer 336 of the transfer sheet 330 could be wound around the second roller 320, thereby retracting the transfer sheet from beneath the patient and decoupling from the patient. In another example, a predetermined amount of the transfer sheet 330 could be configured to be wound around each roller, and retracting the sheet could include winding a predetermined amount of the transfer sheet around the first roller 310 and the second roller 320, respectively. Other retraction schemes could be envisioned by one or ordinary skill in the art.

The device 300 could also include one or more motors 340 or other electromechanical actuators configured to apply driving and/or retracting force(s) to rotate the first 310 and/or second 320 rollers. Such a motor 340 could power the winding and/or unwinding of the transfer sheet 330, thus facilitating patient repositioning and/or retracting of the transfer sheet. The motor(s) 340 may be coupled to the rollers 310, 320 by way of a series of pulleys 350 and clutch bearings that could allow the motor(s) 340 to selectively control one or more rollers independently. In some examples, the motor 340 is a stepper motor. In a more particular example, the motor 340 could be a switched reluctance type stepper motor. As apparent to one of ordinary skill in the art, a variety of configurations could allow for the powering of the first 310 and/or second 320 roller by a motor 340 or plurality of motors 340*a*, 340*b*.

In one example, a motor 340 could be coupled to at least the first roller 310 and used to power the retraction of the transfer sheet 330 around the first roller 310. In such an example, winding the top layer 334 of the transfer sheet 330 around the first roller 310 could include actuating the motor 340 to wind the transfer sheet around the first roller, thereby moving the patient in a direction toward the first roller 310. Such a configuration would allow a user of the apparatus 300 to reposition a patient in the direction of the first roller 310 with less force, fewer personnel, reduced risk of injury, in less time, or with some other benefit. In some embodiments, the motor 340 could be operable to rotate the first roller 310 in either a clockwise or counterclockwise direction, thereby allowing a user to power the unwinding of the transfer sheet 330 from the first roller 310.

In some examples, a motor 340 may be coupled to and used to power the second roller 320. This motor 340 could be the same motor used to power the first roller 310 or a separate motor. The motor 340 may then be actuated to wind of the bottom layer 336 of the transfer sheet 330 around the second roller 320, thereby retracting the transfer sheet (i.e., such that the transfer sheet is removed from beneath the patient). This could allow a user of the apparatus 300 to quickly and easily remove the transfer sheet 330 from the transfer surface (e.g., to remove the sheet without the need to turn the patient, without additional personnel, without manually pulling the sheet, or with some other benefit). Additionally or alternatively, the motor 340 could be operable to rotate the second roller 320 in a direction that unwinds the transfer sheet 330 from the bottom roller. In such a configuration, a user of the apparatus 300 may actuate the motor 340 to unwind the transfer sheet 330 from the second roller 320.

Referring back to FIG. 3A, in some instances the patient transfer apparatus 300 could include a first motor 340*a*, operable to power the first roller 310, and a second motor 340*b*, operable to power the second roller 320. In such a configuration, the first 310 and second 320 rollers can be rotated independently by selectively actuating (e.g., powering) the first 340*a* and/or second 340*b* motors. In some embodiments, the first 340*a* and second 340*b* motor could be coupled to the first 310 and second 320 roller by way of a first 350*a* and second 350*b* pulley, respectively. The apparatus 300 could further include a clutch (i.e., a clutch bearing) coupled to the pulleys 350*a*, 350*b*; motors 340*a*, 340*b*, a drive shaft, or another element of the apparatus 300. Such a clutch may add an additional layer of control to the winding and/or unwinding of the transfer sheet 330 from the first 310 and/or second 320 rollers.

Referring to FIG. 3B, in some examples, a single motor (e.g., motor 340) could be coupled to and operable to rotate both the first 310 and second 320 rollers. In such a configuration, the motor 340 could include one or more clutch such that the motor can rotate the first roller 310 and the second roller 320 independently. The clutch could be coupled to the motor 340, the first 310 and second 320 rollers, and/or a pulley(s) 350 coupled to the motor or rollers. As described herein, the clutch may be operable to selectively engage and disengage the rollers 310, 320 and/or pulley(s) 350 such that they can be controlled independently (i.e., the first roller 310 can be rotated to wind or unwind the transfer sheet 330 without rotating the second roller 320, and vice versa). When such a clutch is engaged, powering the motor 340 can cause the first 310 and/or second 320 rollers to rotate, thereby-winding or unwinding the transfer sheet 330. Conversely, when the clutch is disengaged from the first 310 and/or second 320 rollers, the roller(s) may rotate freely (e.g., allowing a user to manually wind or unwind the transfer sheet 330 from the roller(s)).

Referring to FIG. 3C, in still another embodiment, a single motor (e.g., motor 340) may be coupled to a plurality of pulleys 350*a*, 350*b* in order to control a first 310 and second 320 roller by way of a single motor. Such a single-motor embodiment may reduce the cost of using the device, the power used, or provide some other benefit. In a particular example, a motor 340 could be coupled to a first pulley 350*a* and a second pulley 350*b*, wherein the first pulley 350*a* is coupled to the first roller 310 and the second pulley 350*b* is coupled to the second roller 320. Like previous embodiments, a clutch may be used to selectively engage/disengage elements of the apparatus 300 such that the first 310 and second 320 rollers can be operated independently to wind and/or unwind the transfer sheet 330. In varying examples, the clutch could be coupled to the motor 340, the first 350*a* and/or second 350*b* pulleys, the first 310 and/or second 320 rollers, a drive shaft or another element of the apparatus 300.

Figure 4:
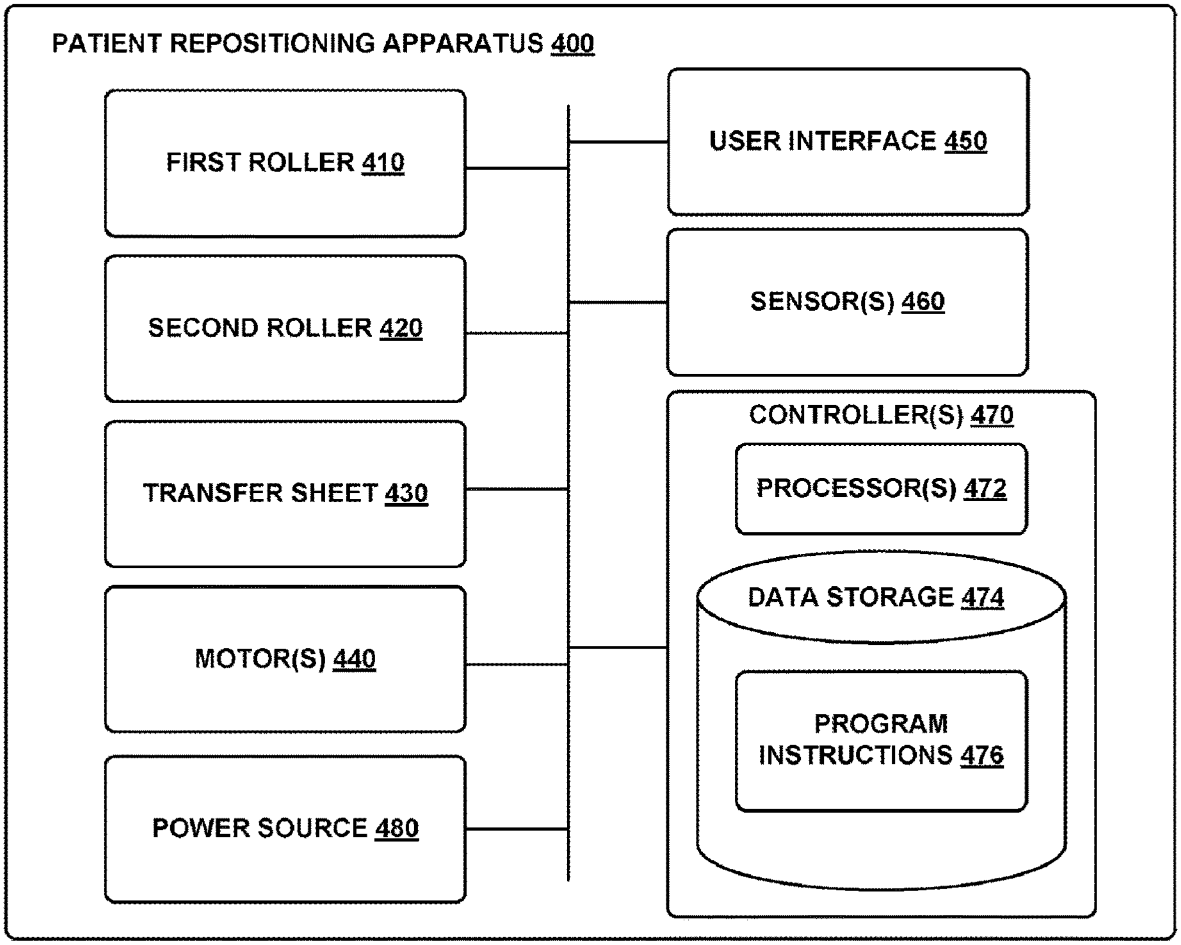
FIG. 4 shows a block diagram of a patient transfer apparatus in accordance with embodiments of the present disclosure.

FIG. 4 illustrates a block diagram of a patient transfer apparatus 400 according to the present disclosure. The patient transfer apparatus 400 includes a first roller 410, a second roller 420, a transfer sheet 430, one or more motors 440, a user interface 450, and controllers) 470. The controllers) 470 include one or more processors 472, which can include or take the form of a central processing unit (CPU), such as one or more general purpose processors and/or one or more dedicated processors (e.g., application specific integrated circuits (ASICs) or digital signal processors (DSPs), etc.). The controllers 470 further include data storage 474, winch can include or take the form of one or more non-transitory computer-readable storage media that can be read or accessed by the processors) 472. The one or more computer-readable storage media can include volatile and/or non-volatile storage components, such as optical, magnetic, organic, or other memory or disc storage. In some examples, the data storage 474 can be implemented using a single physical device (e.g., one optical, magnetic, organic, or other memory or disc storage unit), while in other examples, the data storage 474 can be implemented using two or more physical devices.

The processor(s) 472 can be configured to execute computer-readable program instructions 476 that are stored in die data storage 474 and are executable to provide some or all of the functionality described herein. For instance, in line with the discussion above, the processor(s) 472 can execute the computer-readable program instructions 476 to control various aspects of the winding and/or unwinding of the transfer sheet 430 from the rollers 410, 420. In various embodiments, the computer-readable program instructions could include instructions to operate the rollers 410, 420 according to a predetermined scheme, in response to data from a sensor, or in response to data from a user interface 450. In one example, it may be desirable to stop the motor 440 automatically when the transfer sheet 430 is fully unwound from the first 410 and/or second 420 rollers. In such an example, the controller 470 could include a sensor 460 configured to detect when the transfer sheet 430 is fully unwound from the first 410 and second 420 rollers and, responsive to detecting the transfer sheet is folly unwound, stop the motor 440 and/or disengage the clutch.

In a similar example, the controller 470 could be operable to stop the motor 440 when the transfer sheet 430 is fully wound around the first 410 and second 420 rollers (i.e., folly retracted). In such an example, the sensor 460 could be configured to determine when the transfer sheet 430 is fully retracted, and, responsive to the determination, stop the motor 440 and/or disengage the clutch. In one example, substantially the entire transfer sheet 430 could be configured to be would around the second roller 420, and the controller 470 could be operable to stop the second roller 420 (by stopping power to a motor 440 coupled to the second roller, by disengaging a clutch on the second roller or a pulley coupled to the second roller, or by some other means) when the transfer sheet 430 is folly wound around the second roller 420. In another example, the transfer sheet 430 could be configured to be partially wound around both the first 410 and second 420 rollers when the sheet is retracted (i.e., a predetermined portion of the transfer sheet is wound around each of the first and second rollers when the sheet is fully retracted). In such an example, the controller 470 could be operable to stop the second roller 420 (e.g., by any of the means previously mentioned) when a predetermined portion of the transfer sheet 430 is wound around the second roller 420

In some examples, the controller 470 may also be used to controllably inflate the one or more inflatable chamber(s) provided in the transfer sheet 430. For example, the controller could be operable to power an air compressor in fluid communication with the chamber(s) in the transfer sheet (by way of an air conduit and/or an entrance port). In some examples, the controller could be configured to inflate the one or more chambers (e.g., a right-side chamber and a left-side chamber) in a predetermined order or at a predetermined time. The controller could be further configured to prevent the inflation of the one or more chambers while the transfer sheet 430 is wound around either the first 410 and/or second 420 rollers, such that die transfer sheet 430 can only be inflated when the sheet is fully retracted and positioned under a patient.

A controller 470 could also function to change a speed of rotation of one or both rollers 410, 420, engage or disengage a clutch of one or more of the rollers, actuate some other element, change a flow of air into the transfer sheet 430, or change a setting of the apparatus 400. Such a controller may be operable to affect elements or change various settings of the apparatus 400 responsive to a user input on a user interface 450 of the apparatus 400. The user interface 450 could include one or more buttons, switches, dials, a touch pad, a display, and/or a touch screen. The user interface 450 may enable a user of the apparatus 400 to interact in various ways with elements of the apparatus 400. For example, the user interface may include hardware and/or software configured to control the motor(s) 440, rollers 410, 420, air compressor, and/or the clutch. In some examples, the user interface 450 could include one or more input controls (e.g., buttons, switches, dials, or controls on a touchscreen) configured to actuate the motor(s) 440, thereby powering the winding and/or unwinding of the transfer sheet 430 from the first 410 and/or second 420 rollers. In particular, the user interface 450 could include an input control configured to retract the sheet from under the patient and wind it around the second roller (i.e., a pull function), and another input control for winding the transfer sheet around the first roller (i.e., to boost the patient). Additionally or alternatively, a user interface 450 of the apparatus 400 could be configured to engage or disengage the clutch, thereby allowing a user to select which roller is being actuated at a given time. The user interface 450 could further include one or more input controls to selectively inflate a particular chamber formed in the transfer sheet in order to, e.g., selectively lift or reposition a particular side of the patient. In a particular embodiment, the user interface 450 could include an input control for filling a left side chamber of the transfer sheet with air, another input control for filling a right-side chamber of the transfer sheet with air, and yet another input control for filling both and/or all chambers of the transfer sheet with air. Further configurations and functions of the user interface 450 may be envisioned by one or ordinary skill in the art.

The patient transfer apparatus 400 could further comprise a power source 480 configured to power the motor(s) 440, a user interface 450, an air compressor, and/or other powered elements of the system. The power source 480 could be a wall outlet or another wired power source. In another example, the apparatus 400 could take power from an associated device proximate to the patient repositioning apparatus 400, and powering the apparatus could involve connecting the apparatus to the associated device. In a particular example, the patient repositioning apparatus 400 could be positioned proximate to an electric hospital bed (e.g., a hospital bed that is powered to aid in movement, adjustment, or other functions of the bed) and the apparatus 400 could receive power from the electric hospital bed. To improve portability of the apparatus 400, the power source 480 could be a battery disposed e.g., within the housing of the apparatus. The battery could be used as a main power source, or could be used as a back-up power, such that the apparatus receives power from the battery when no other power source is available.

Additionally or alternatively, the first 410 and/or second 420 rollers could be powered by a mechanical actuator. In such an example, the apparatus 400 could include a mechanical actuator, and winding the transfer sheet 430 around the roller! s) 410, 420 could include winding the sheet 430 using a mechanical actuator. In some examples, the mechanical actuator could be powered manually (i.e., by a user of the apparatus). In a particular example, the mechanical actuator could include a crank coupled to the first and/or second roller(s) 410, 420, and winding and/or unwinding the transfer sheet 430 could be controlled by turning the crank. The mechanical actuator could also include a foot pedal, a spring, a button, or any other actuator configured to rotate a roller by way of a force imparted by a user.

In some alternative embodiments, retraction of the transfer sheet 430 around the first 410 and/or second 420 rollers could be powered by a spring mechanism. Such a spring mechanism could operate similarly to e.g., retractable blinds, wherein the spring gains potential energy and becomes tighter as the transfer sheet 430 is unwound from the roller(s) 410, 420. Subsequent retraction of the transfer sheet 430 can then be powered by releasing the energy held in the spring, causing the sheet to wind around the first 410 and/or second 420 rollers. In such an embodiment, the first 410 and/or second 420 roller could comprise a spring, and unwinding the transfer sheet from the second roller could cause the spring to gam potential energy. Winding the bottom layer of the transfer sheet 430 around the second roller 420 could comprise releasing the potential energy from the spring, thereby retracting the transfer sheet 430 from under the patient. In such an example, the transfer sheet 430 could be configured to wind around the first 410 and/or second 420 roller(s) responsive to, e.g., a tug of the transfer sheet 430, or another physical movement of the sheet (i.e., such that the retraction of the sheet is initiated similarly to retractable blinds). Other means of winding and/or unwinding the transfer sheet 430 from the rollers 410, 420 are envisioned by one with ordinary' skill in the art.

Figure 5:
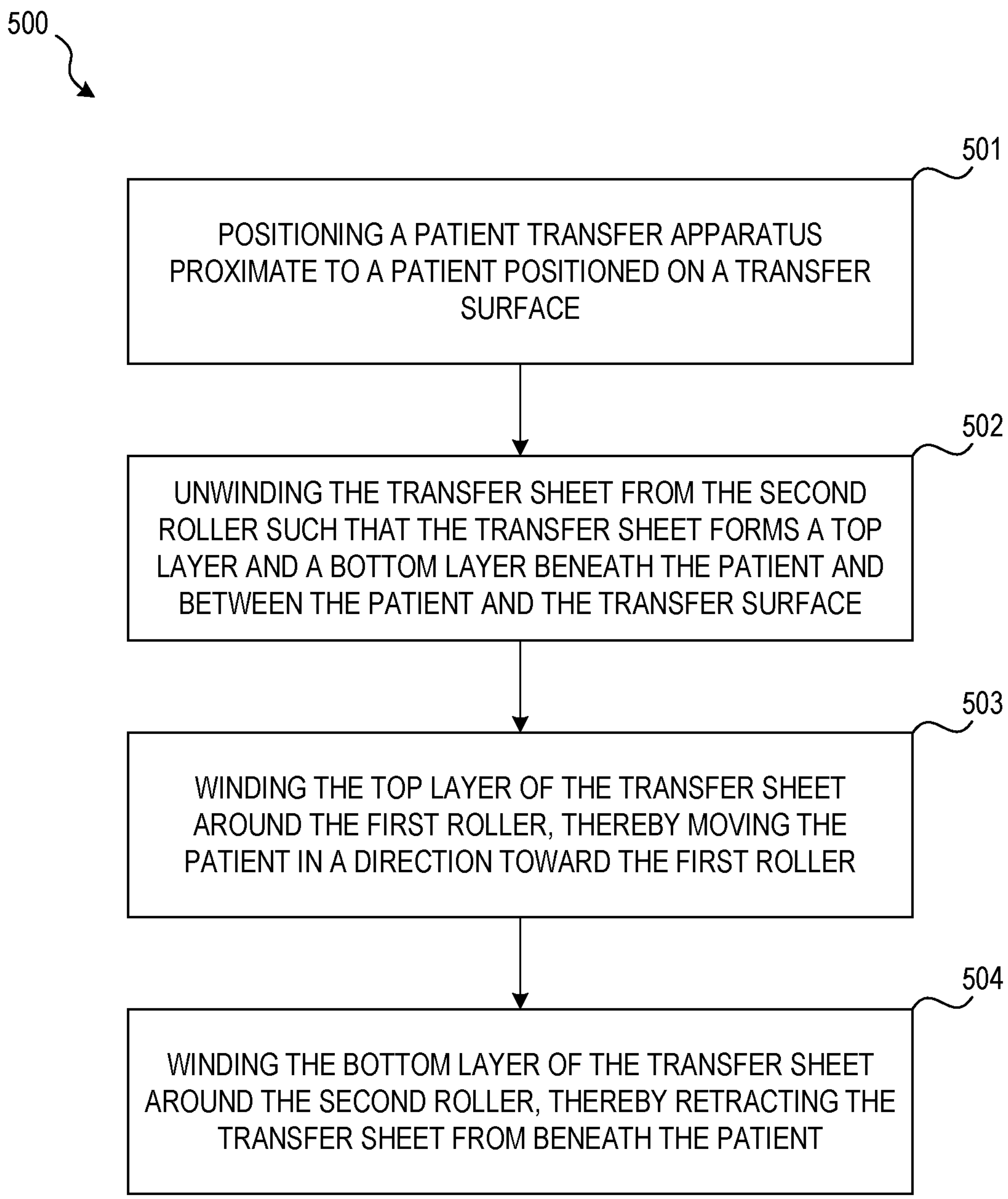
FIG. 5 shows a flow chart of a method of repositioning a patient in accordance with embodiments of the present disclosure.

FIG. 5 illustrates a flowchart of a method 500 for operating a patient repositioning system, such as any of the apparatuses shown in FIGS. 1, 2.4-B, 3.4-C, or 4 and described herein. For purposes of illustration, the patient transfer apparatus operated in method 500 includes a first roller, a second roller, and a transfer sheet. The first roller and second roller can be arranged on one side of a transfer surface, with a first end of the transfer sheet coupled to the first roller and a second end of the transfer sheet opposite the first end coupled to the second roller. The transfer sheet is configured to unwind from the second roller to form a top layer and a bottom layer beneath die patient and between the patient and die transfer surface. The top layer of the transfer sheet is configured to slide toward the first roller, moving the patient in the direction of the first roller. The bottom layer of the transfer sheet is configured to slide between the transfer surface and the top layer of the transfer sheet.

A first portion of the method could include placing die apparatus near a patient and/or surface in order to move the patient in the direction of the apparatus. Block 501 of method 500 includes positioning the patient transfer apparatus proximate to a patient positioned on a transfer surface. Positioning the patient transfer apparatus could include positioning the apparatus proximate to a patient bed, such as a hospital bed, a stretcher, a medical table, a surface of a full-body imaging system (e.g., an MRI system), or another like surface. In some embodiments, the patient transfer apparatus could be detachably coupled to the surface so that it is secured proximate to the transfer surface while the apparatus is in use, but can be removed from the surface after use. To facilitate positioning of the patient transfer apparatus, the housing or another element of the apparatus could include an attachment mechanism. For example, the patient transfer apparatus could include one or more clamps, hook and loop fasteners, ties, adhesives, or other means for attachment. In a particular example, positioning the apparatus could include securing it to the transfer surface with a clamp.

In another embodiment, the patient transfer apparatus could be disposed on a stand (e.g., a wheeled stand, a tripod, or another support) and positioning the apparatus proximate to a patient positioned on a transfer surface could include placing or rolling the device proximate to the transfer surface. Additionally or alternatively, the patient transfer apparatus could be disposed on an armature (e.g., an armature coupled to the transfer surface or a standalone device) and positioning the apparatus could include moving the armature proximate to the patient and/or transfer surface. In some cases, the patient transfer apparatus may form part of the transfer surface or be irreversibly coupled to the transfer surface. For example, a patient bed, a hospital bed, a stretcher, or another like surface could be designed to include the patient transfer apparatus, disposed at an appropriate location relative to the patient and transfer surface. In such an example, positioning a patient transfer apparatus proximate to a patient could include positioning the patient on the transfer surface.

Once the apparatus has been positioned and/or secured proximate to the patient, the transfer sheet can be pulled across the transfer surface and under the patient. Block 502 of method 500 includes unwinding the transfer sheet from the second roller such that the transfer sheet forms a top layer and a bottom layer beneath the patient and between the patient and the transfer surface. Unwinding the transfer sheet from the second roller could include pulling the sheet in a direction away from the second roller, thereby unwinding the transfer sheet from the roller. In some examples, the retracted transfer sheet may be partially or fully wound around the first roller in addition to the second roller. In such an example, unwinding the transfer sheet from die second roller could further include unwinding the transfer sheet from the first roller.

As described in relation to the system, a first end of the transfer sheet is coupled to the first roller and a second end of the transfer sheet opposite the first end is coupled to the second roller. Pulling the sheet at a point between the first end and the second end (i.e., at a portion of the sheet between the first and second rollers) could cause the sheet to unwind from the roller(s), resulting in the formation of a top layer and a bottom layer under the patient and between the patient and the transfer surface. The top layer may comprise a portion of the transfer sheet proximate to the first end (i.e., the end coupled to the first roller), while the bottom layer could comprise a portion of the transfer sheet proximate to the second end (i.e., the end coupled to the second roller). The top and bottom layer could be joined at a fold, as previously described, with both layers forming a portion of a continuous transfer sheet. The fold could be located at a midpoint of the transfer sheet (i.e., at a point between the first end and the second end) located opposite the patient transfer apparatus when the sheet is unwound from the roller(s).

To facilitate unwinding of the transfer sheet, the transfer sheet could include one or more handles, and unwinding the transfer sheet from the second roller could include pulling the transfer sheet by a handle of the sheet. The handle(s) could be disposed at an outer edge of the transfer sheet, for example, along a hem of the transfer sheet. Additionally or alternatively, handle(s) could be disposed at a midpoint of the transfer sheet (i.e., at a point between the first end and the second end of the transfer sheet, or a point disposed between the first and second rollers when the transfer sheet is fully retracted). In such a case, pulling the handle(s) could form a fold at the midpoint when the transfer sheet is unwound from the roller(s) and positioned beneath the patient and between the patient and the transfer surface.

After unwinding the transfer sheet from the roller(s) and positioning the sheet under the patient, the patient may be repositioned by moving the top layer of the sheet relative to the bottom layer of the sheet. In some examples, the top layer of the sheet may be moved by winding the transfer sheet around the first roller. Block 503 of method 500 includes winding the top layer of the transfer sheet around the first roller, thereby moving the patient in a direction toward the first roller. The transfer sheet, as previously described, may have low-friction properties on one or more surfaces of the sheet. Winding the top layer of the transfer sheet around the first roller could include sliding a low friction surface of the top layer of the transfer sheet against a low friction surface of the bottom layer of the transfer sheet.

In some cases, winding the top layer of the transfer sheet could reposition the patient on a transfer surface (e.g., causing a patient to sit upright, moving a patient from one side of the transfer surface to another side of the surface). In other situations, the apparatus may be used for moving a patient from one transfer surface to another. For example, a patient could be moved from a stretcher to a hospital bed, from a hospital bed to a full-body imaging system, or some other transfer between surfaces. In these cases, moving the patient m a direction toward the first roller could include moving a patient onto or off of a transfer surface. Additionally or alternatively, it could be desirable to move a patient in a direction other than toward the first roller. In this case, the method 500 could further include sliding the top layer of the sheet relative to the bottom layer of the sheet, thereby moving the patient relative to the transfer surface (i.e., to move them in whatever preferred direction).

Additionally or alternatively, the transfer sheet could include one or more chambers configured to receive air or some other gas, and method 500 could include inflating at least a portion of the transfer sheet m order to lift, rotate, or otherwise reposition a patient. In such examples, inflating the transfer sheet could include powering an air compressor to force air into one or more chambers disposed in the transfer sheet, After repositioning the patient (e.g., by retracting the top layer of the sheet at least partially around the first roller or by inflating a portion of the transfer sheet), the remaining portion of the sheet can then be removed from under the patient using the second roller. Block 504 of method 500 includes winding the bottom layer of the transfer sheet around the second roller, thereby retracting the transfer sheet from beneath the patient. Due to the favorable material properties of the transfer sheet, the sheet may be removed from the patient with reduced friction. Retracting the transfer sheet from beneath the patient may then be performed without needing to move the patient off of the transfer sheet, with reduced force, with fewer personnel, with reduced chance of injury, or with some other benefit.

In some examples, the apparatus could be designed or configured such that a predetermined portion of the transfer sheet is wound around the second roller and the first roller, respectively, when the sheet is fully retracted. For instance, in one embodiment, the apparatus could be configured to wind substantially the entire transfer sheet around the second roller. This would necessitate winding both the transfer sheet that remains on the transfer surface (i.e., at least the bottom layer) as well as any of the transfer sheet that has been wound around the first roller during Block 503 of the method. In such a case, winding the bottom layer of the transfer sheet around the second roller could include unwinding the transfer sheet from the first roller and winding substantially all of the transfer sheet around the second roller.

In another example, the apparatus could be configured or designed to wind a predetermined amount of the transfer sheet around the second roller (e.g., approximately one half of the sheet or another predetermined amount). Winding the predetermined amount of the sheet of the second roller could require winding or unwinding an amount of the transfer sheet on the first roller. In such an example, the method 500 could further include winding a further amount of the top layer of the transfer sheet around the first roller, thereby retracting the transfer sheet from beneath the patient: or, alternatively, unwinding an amount of the transfer sheet from the first roller, such that the predetermined amount of the transfer sheet is wound around the second roller. Other means and steps are envisioned for retracting an amount of the transfer sheet around at least the second roller.

In some examples, the apparatus could include one or more motors or other electromechanical actuators configured to apply driving and/or retracting force(s) to rotate the first and/or second roller. The motor could be a stepper motor or, in a more particular example, the motor could be a switched reluctance type stepper motor. The method 500 could include actuating the motor to wind or unwind the transfer sheet around one or more of the rollers. For example, a motor could be coupled to the first roller, and block 503 of method 500 could include actuating the motor to wind the top layer of the transfer sheet around the first roller, thereby moving the patient in a direction toward the first roller. Powering the retraction of the first roller could make it easier to reposition a patient, especially heavier patients that may be difficult to move with traditional techniques.

Additionally or alternatively, a motor could be coupled to the second roller and configured to wind or unwind the transfer sheet from the second roller. In examples where the second roller is coupled to a motor, block 504 of the method 500 could include actuating the motor to wind the bottom layer of the transfer sheet around the second roller, thereby retracting the transfer sheet from beneath the patient. Powering the winding of the transfer sheet around the second roller could facilitate retraction of the sheet from under the patient, allowing the sheet to be removed in less time, with less force, or with some other benefit. Additionally or alternatively, the motor could be used to unwind the transfer sheet from the second roller. In this case, block 502 could include actuating the motor to unwind the transfer sheet from the second roller.

In some examples, a separate motor could be used to actuate the second roller and wind/unwind the transfer sheet. Alternatively, a motor could be coupled to and used to power both the first and second rollers, and a control mechanism (i.e., a clutch) could be utilized to control the rollers independently. In such a configuration, a clutch could be coupled to the first and/or second rollers and be operable to selectively engage and disengage the rollers such that they can be controlled independently (i.e., the first roller can be powered to wind or unwind the transfer sheet without powering the second roller, and vice versa). When such a clutch is engaged, powering the motor can cause the first and/or second rollers to rotate, thereby winding or unwinding the transfer sheet. Conversely, when the clutch is disengaged from the first and/or second rollers, the respective roller(s) may rotate freely (allowing a user to, e.g., manually unwind the transfer sheet from the roller(s)).

In some examples, elements of the apparatus (e.g., the motor(s), clutch bearing(s), rollers, or air compressor) could be controlled by a user interface of the apparatus. The user interface could include one or more buttons, switches, dials, a touch pad, a display, and/or a touch screen in order to accept a user input, as described in relation to the apparatus. The method 500 could include interacting with the user interface in order to affect the operations of the motor, the clutch, the first and/or second rollers, or additional elements of the apparatus. In a particular example, the method could include: accepting, at a user interface of the apparatus, a user input; and, responsive to receiving the user input, activating the motor to actuate the first and/or second roller. Additionally or alternatively, the user interface could be configured to engage or disengage the clutch, and the method 500 could include: accepting a user input at a user interface of the apparatus; and, responsive to receiving the user input, engaging and/or disengaging a clutch of the apparatus. Other functionalities of the user interface are envisioned by one of ordinary skill in the art.

The motor(s) could further include a controller configured to control various aspects of the motor. The controller could be used to determine when the transfer sheet is wound around the roller(s) and automatically stop the motor when the transfer sheet is sufficiently wound or unwound. In one example, the controller could be operable to stop the motor when the transfer sheet has been folly wound onto the first and/or second roller, and winding the bottom layer of the transfer sheet around the second roller could comprise using the controller to stop the motor. In a particular example, the method 500 could include determining, by way of a controller, that the transfer sheet is folly wound around the first and/or second roller; and, responsive to determining that the transfer sheet is folly wound around the first and/or second roller, stopping the motor. When the apparatus is configured to wind a predetermined amount of the transfer sheet around one or more of the rollers, the controller could be used to determine the predetermined amount. The method 500 could then include determining, by way of the controller, when a predetermined portion of the transfer sheet is wound around the first and/or second rollers; and, responsive to determining that a predetermined portion of the transfer sheet is wound around the first and/or second rollers, stopping the motor. Other aspects of the motor's operations could be controlled by the controller as well. For instance, the controller could be used to enable or disable a clutch of the motor(s), to adjust a speed of rotation of the first and/or second rollers, to change a direction of the rotation of the one or more rollers, or affect some other operations of the apparatus.

Additionally or alternatively, the rotation of the first and/or second rollers could be powered manually (i.e., by a user of the apparatus). In such an example, the first and/or second rollers could be rotated by a mechanical actuator, for instance, a crank, a spring, a foot pedal, or a button. In such an example, winding the transfer sheet around the roller(s) could include using a mechanical actuator to rotate the rollers, thereby winding the transfer sheet. In an example where the mechanical actuator is coupled to the first roller, winding the top layer of the transfer sheet around the first roller could include using a mechanical actuator to wind the top layer of the transfer sheet around the first roller, thereby moving the patient in a direction toward the first roller. Additionally or alternatively, the mechanical actuator could be coupled to the second roller, and the method 500 could include using a mechanical actuator to wind the bottom layer of the transfer sheet around the second roller, thereby retracting the transfer sheet from beneath the patient. In a particular example, the mechanical actuator could include a crank coupled to the first and/or second roller(s), and the method could include turning the crank to wind or unwind the transfer sheet from the first and/or second rollers.

Similarly, retraction of the transfer sheet around the first and/or second rollers could be powered by a spring mechanism, as described in relation to the apparatus. Such a spring mechanism could function by gaining potential energy as the transfer sheet is unwound from the roller(s). For example, unwinding (e.g., pulling) the transfer sheet from the second roller could cause the spring mechanism to build up potential energy, such that a subsequent winding of the transfer sheet around the second roller can be powered by the built-up energy. In such a case, the method 500 could include unwinding the transfer sheet from the first and/or second rollers, thereby causing a spring to gain potential energy. The method 500 could further include releasing the potential energy from the spring to wind the bottom layer of the transfer sheet around the second roller, thereby retracting the transfer sheet from beneath the patient.

The example method 500 illustrated in FIG. 5 is meant as an illustrative, non-limiting example. Blocks and steps described herein may be carried out sequentially or in parallel. Furthermore, the various block and steps could be carried out in a different order than described herein and some blocks and steps could be omitted, skipped, and/or repeated. Additional or alternative elements of the methods and additional or alternative components of the systems may be implemented as will be obvious to one skilled in the art.

Referring now to FIGS. 7-10, the present disclosure provides a transfer sheet cartridge 700 configured to house a transfer sheet 730. The transfer sheet 730 may be made of any suitable material, and may be single-use (e.g., disposable) or intended to be used multiple times. Transfer sheet cartridges 700 consistent with the present disclosure enable convenient replacement of transfer sheets 730 compared to conventional motorized or assisted patient repositioning systems. In some embodiments, the transfer sheet 730 is semi-rigid such that extension of the transfer sheet 730 under the patient P does not require substantial assistance (e.g., pulling) by a clinician. In other embodiments, the transfer sheet 730 is not rigid (e.g., is flexible) such that extension of the transfer sheet 730 under the patient P requires a clinician to assist advancement of the transfer sheet below the patient P, for example by pulling or guiding the transfer sheet 730 from the side of the patient P opposite the repositioning system 800.

Figure 7:
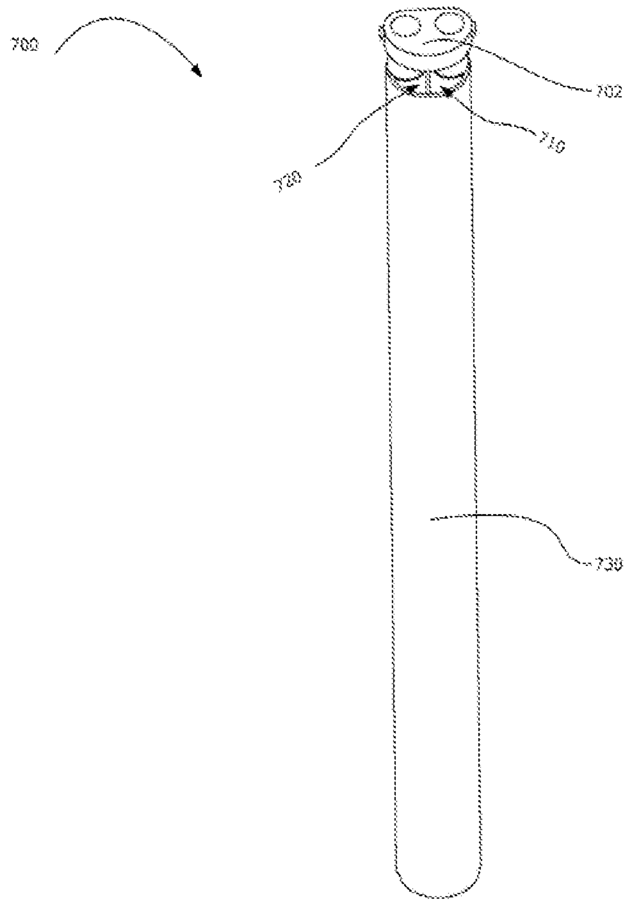
FIG. 7 shows a perspective view of a slide sheet cartridge configured in accordance with embodiments of the present disclosure.
Figure 8:
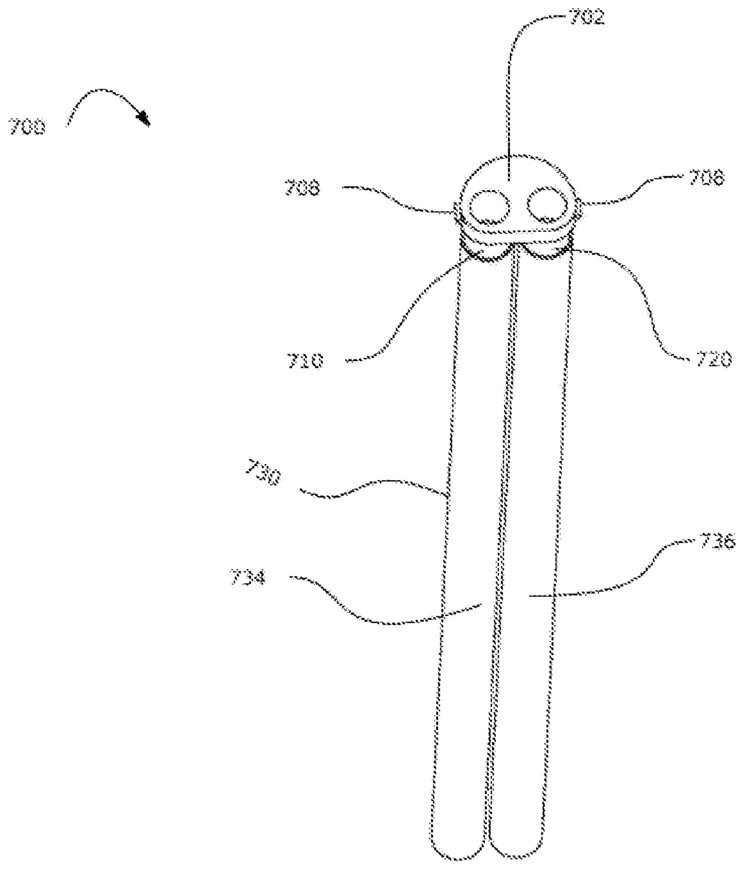
FIG. 8 shows an enlarged perspective view of one end of the slide sheet cartridge of FIG. 7.
Figure 9:
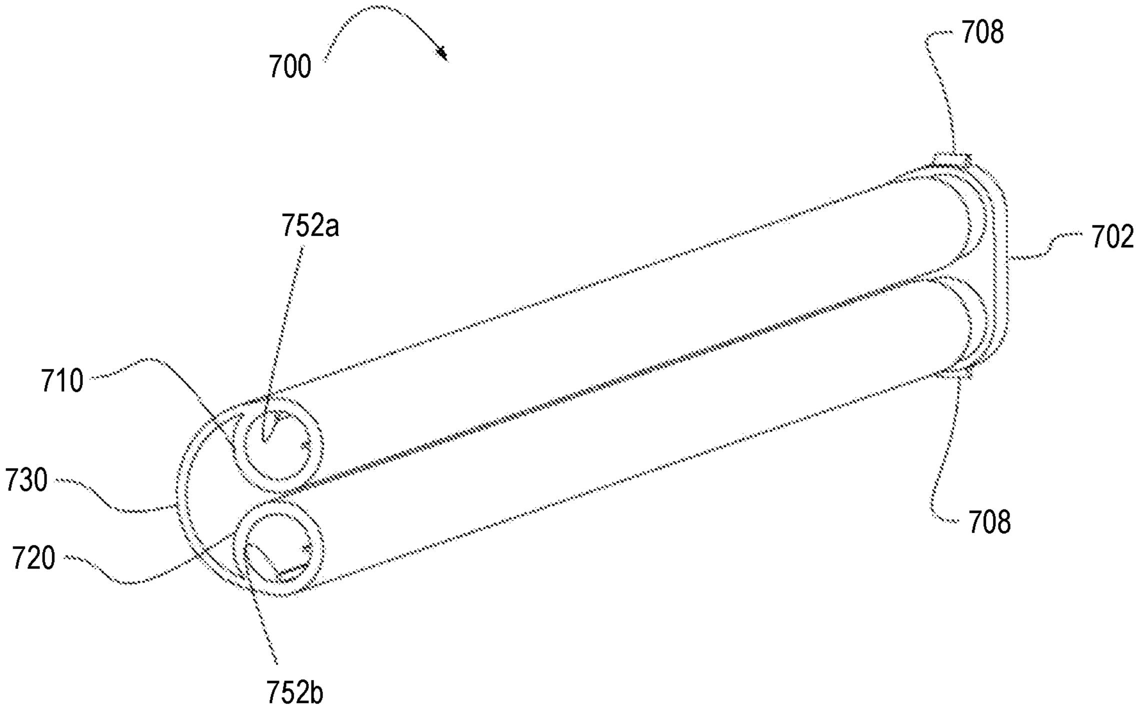
FIG. 9 shows a perspective view of the slide sheet cartridge of FIG. 7.
Figure 10:
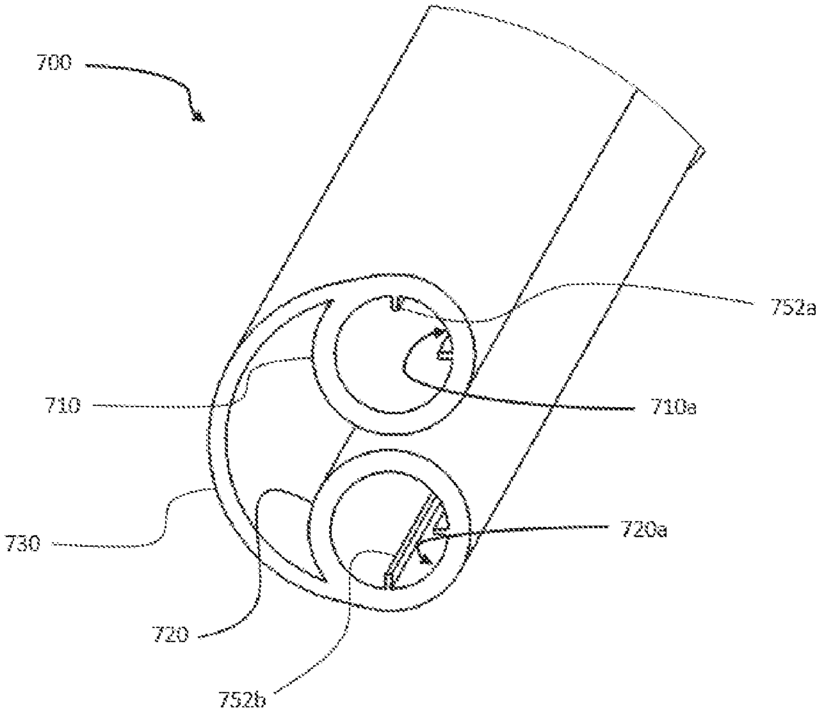
FIG. 10 shows an enlarged perspective view of one end of the slide sheet cartridge of FIG. 7.
Figure 11:
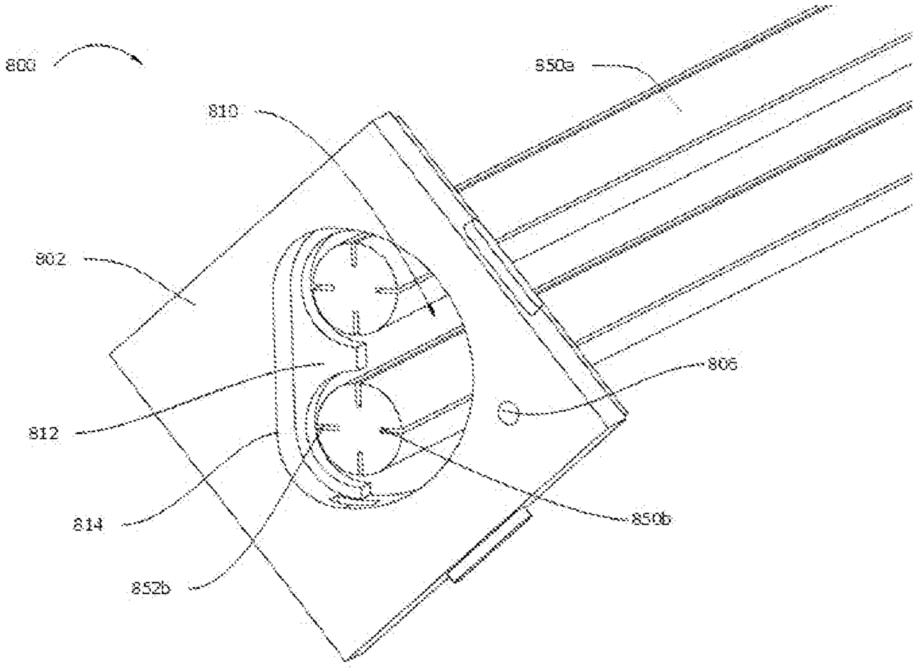
FIG. 11 shows a perspective view of a portion of a slide sheet cartridge actuator configured in accordance with embodiments of the present disclosure.
Figure 12:
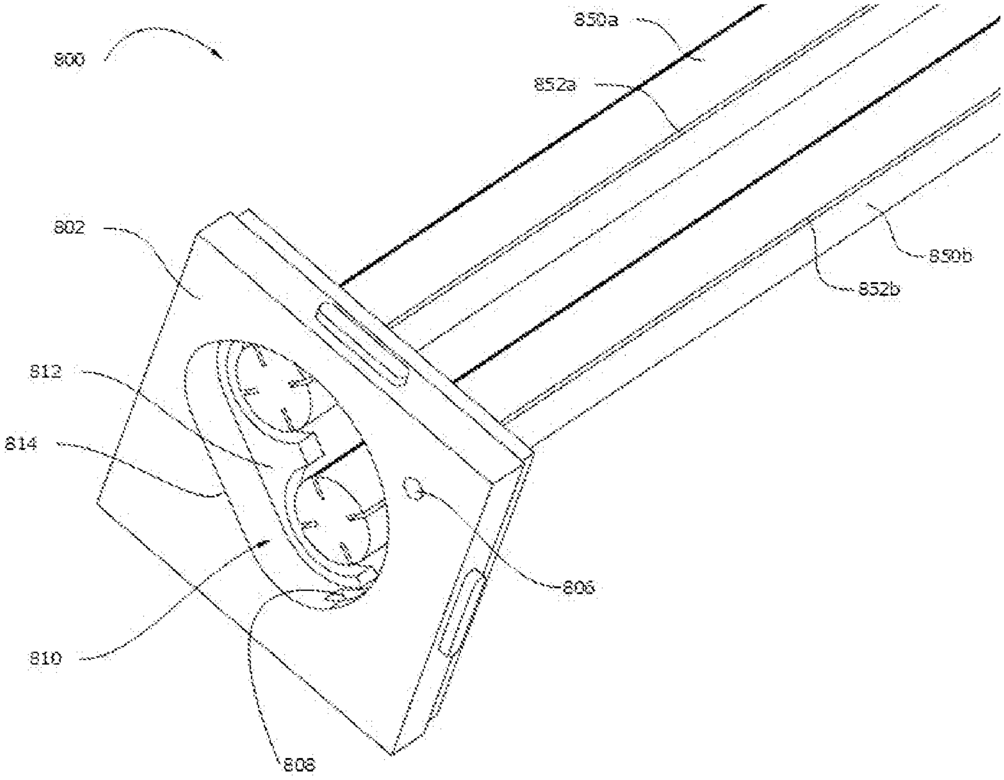
FIG. 12 shows a perspective view of a portion of the slide sheet cartridge actuator of FIG. 11.
Figure 13:
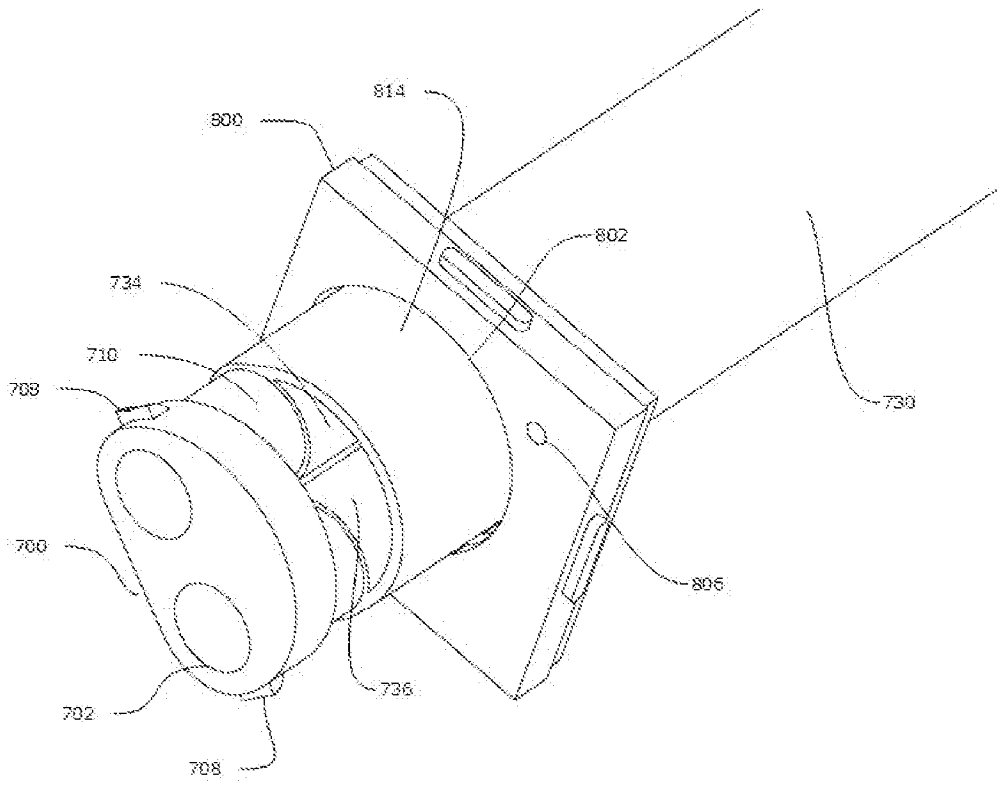
FIG. 13 shows a perspective view of the slide sheet cartridge of FIG. 7 mating with a portion of the slide sheet cartridge actuator of FIG. 11.
Figure 14:
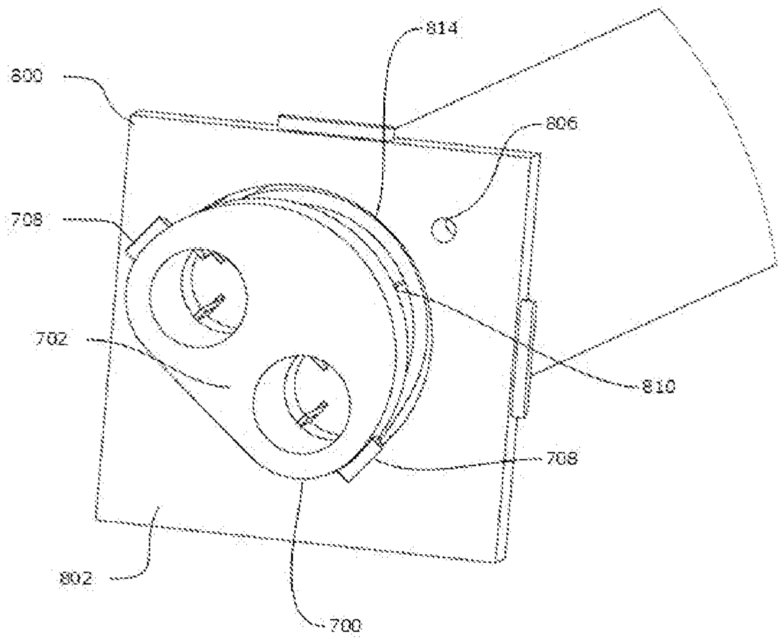
FIG. 14 shows an enlarged perspective view of the slide sheet cartridge of FIG. 7 mating with a portion of the slide sheet cartridge actuator of FIG. 11.
Figure 15:
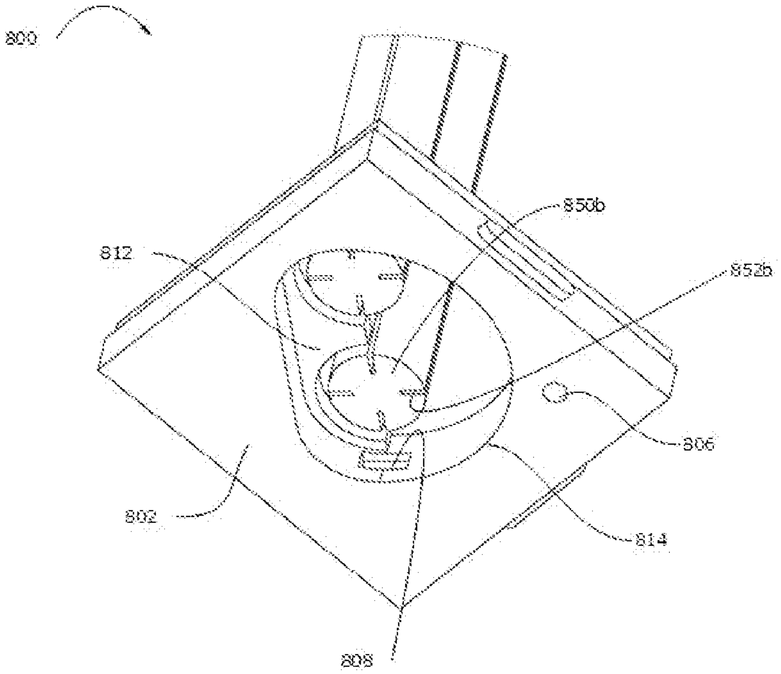
FIG. 15 shows an enlarged perspective view of a portion of the slide sheet cartridge actuator of FIG. 11.
Figure 16:
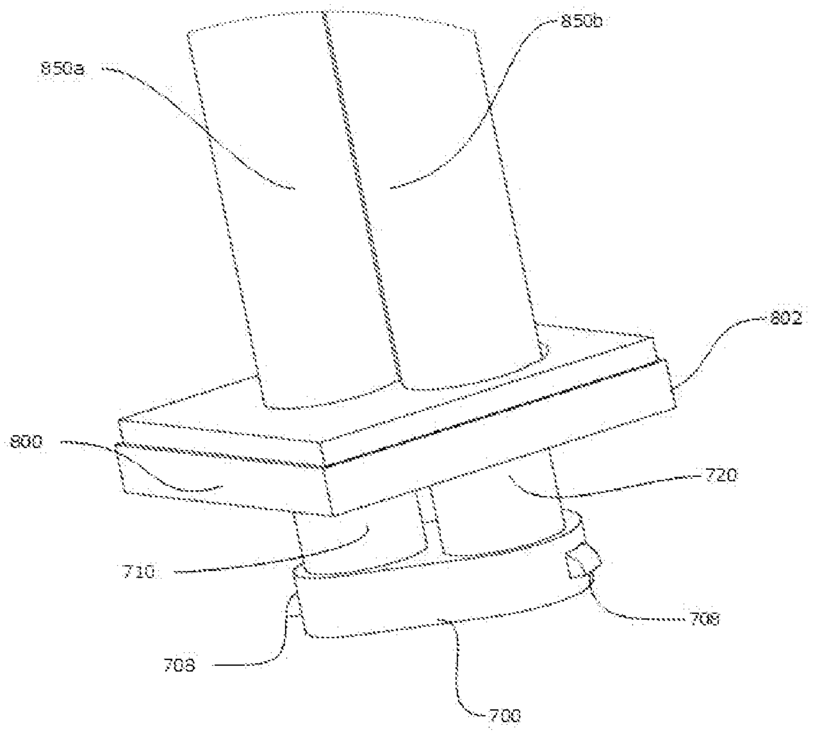
FIG. 16 shows enlarged perspective view of the slide sheet cartridge of FIG. 7 mating with a portion of the slide sheet cartridge actuator of FIG. 11.
Figure 17:
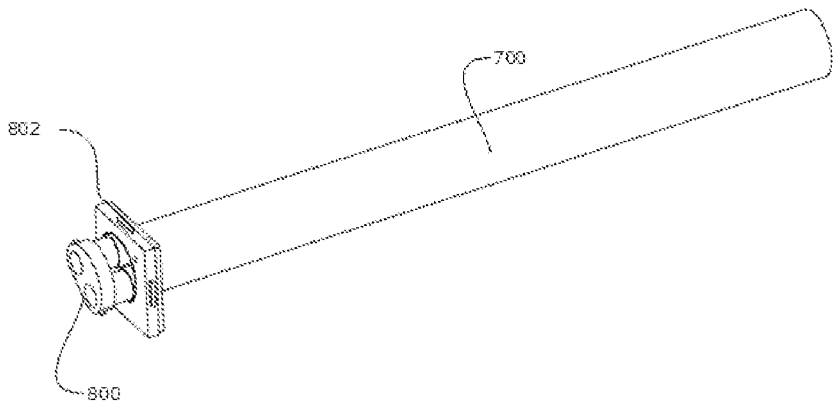
FIG. 17 shows a perspective view of a slide sheet cartridge configured in accordance with embodiments of the present disclosure.
Figures 21A, 21B, 21C:
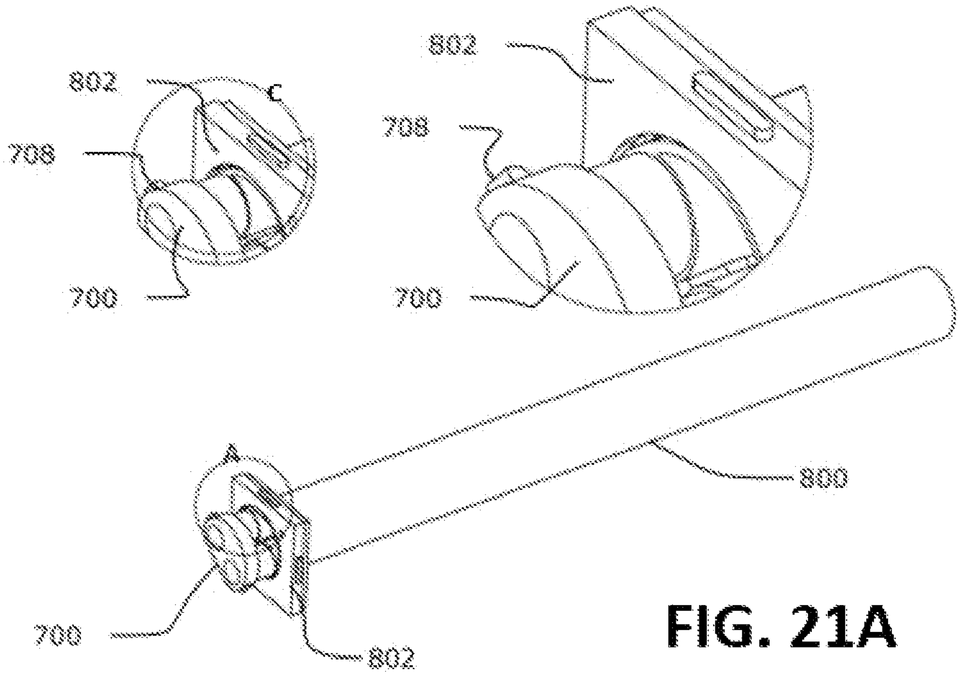
FIG. 21A shows a perspective view of the slide sheet cartridge of FIG. 17.
FIG. 21B shows an enlarged view of a portion of the view of FIG. 21A.
FIG. 21C shows an enlarged view of a portion of the view of FIG. 21B.
Figure 24:
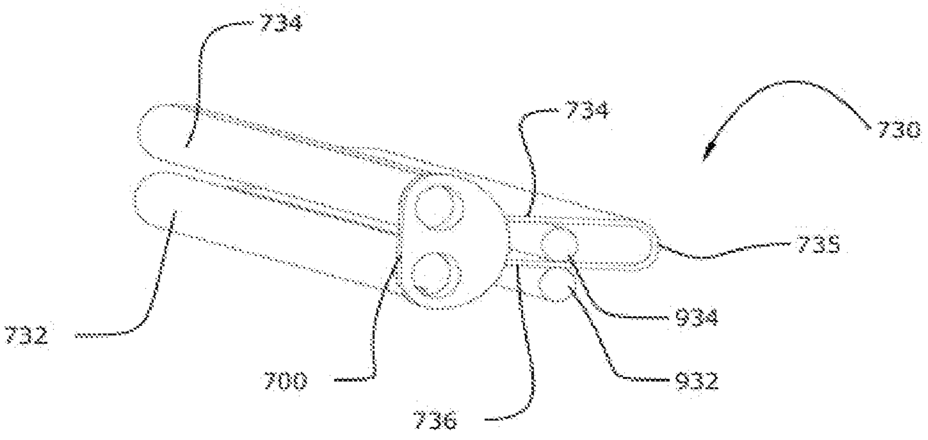
FIG. 24 shows a perspective view of the slide sheet cartridge of FIG. 22.
Figure 25:
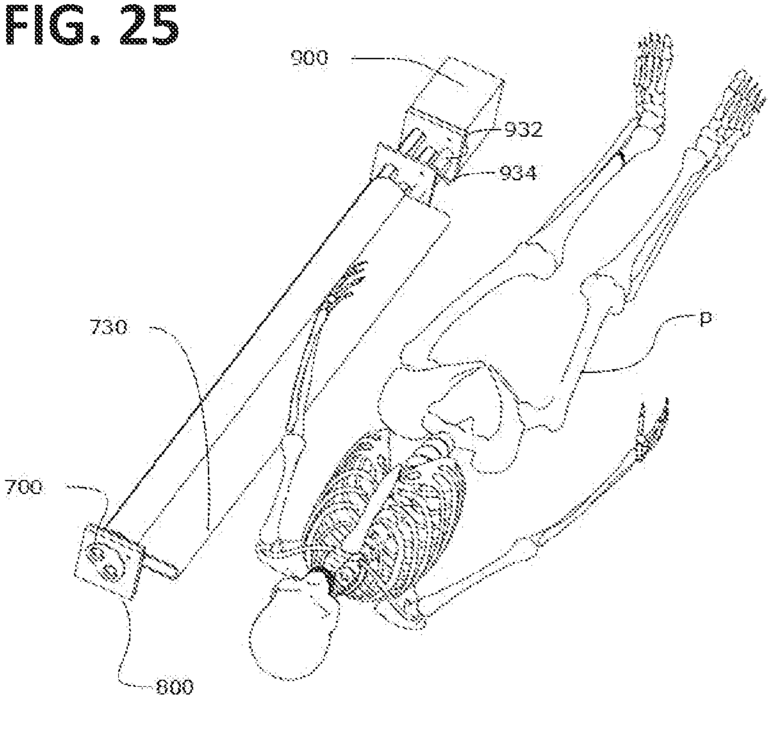
FIG. 25 shows a perspective view of the slide sheet cartridge of FIG. 22 in operative communication with a motor disposed next to a patient (represented by a skeleton).
Figure 31:
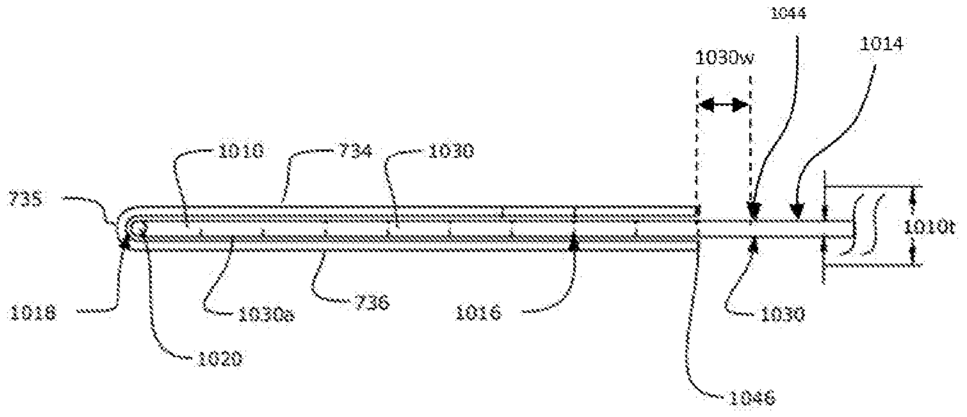
FIG. 31 shows a side view of a portion of an extendable transfer sheet insertion assistance board between a top layer and a bottom layer of a transfer sheet and configured in accordance with embodiments of the present disclosure.

The transfer sheet cartridge 700 may include a housing 702 configured to retain (e.g., rotatably retain) at least one transfer sheet rollers 710, 720. The housing 702 may be sized and shaped to mate with the housing 802 of a patient repositioning system 800. As shown in FIG. 7, the transfer sheet cartridge 700 includes at least one transfer sheet roller 710 rotatably associated with the housing 702. The transfer sheet cartridge 700 is configured to retain at least a portion of the transfer sheet 730 before use with a patient repositioning system 800. For example and without limitation, in some embodiments at least a portion (e.g., about half or substantially all) of the transfer sheet 730 may be wound around the transfer sheet roller 710 when the transfer sheet 730 is in its retracted (e.g., storage) configuration. One end of the transfer sheet 730 is coupled to the first transfer sheet roller 710. In some embodiments, the at least one transfer sheet roller 710 includes at least one retention feature 752*a* configured to interact with a retention feature 852*a* of an actuator 850*a* of the patient repositioning system 800 such that rotation of the actuator 850*a* causes the at least one transfer sheet roller 710 to rotate, and optionally such that rotation of the at least one transfer sheet roller 710 causes the actuator 850*a* to rotate. For example, and without limitation, the at least one retention feature 752*a* may be a detent disposed on an interior surface 710*a* of a tubular transfer sheet roller 710 and configured to mate with a slot 852*a* of a corresponding actuating roller 850*a* over which the tubular transfer sheet roller 710 is disposed during operation of the patient repositioning system 800.

In some embodiments, the transfer sheet cartridge 700 includes a second transfer sheet roller 720 rotatably associated with the housing 702. In such embodiments, the second end of the transfer sheet 730 is coupled to the second transfer sheet roller 720. At least a portion of the transfer sheet 730 may be wound around the second transfer sheet roller 720 when the transfer sheet 730 is in its retracted (e.g., storage) configuration. In some embodiments, the second transfer sheet roller 720 includes at least one retention feature 752*b* configured to interact with a retention feature 852*b* of an actuator 850*b* of the patient repositioning system 800 such that rotation of the actuator 850*b* causes the second transfer sheet roller 720 to rotate, and optionally such that rotation of the second transfer sheet roller 720 causes the actuator 850*b* to rotate. For example, and without limitation, the at least one retention feature 752*b* may be a detent disposed on an interior surface 720*a* of a tubular transfer sheet roller 720 and configured to mate with a slot 852*b* of a corresponding actuating roller 850*b* over which the second tubular transfer sheet roller 720 is disposed during operation of the patient repositioning system 800.

In some embodiments, the transfer sheet 730 is coupled to one or both of the transfer sheet rollers 710 and 720 via one or more mechanical chucks. The mechanical chucks can be, for example, mechanical chucks manufactured by the Converter Accessory Corporation (CAC®). In some embodiments, each of the transfer sheet rollers 710 and 720 has three segments, each of which is coupled to a mechanical chuck. In operation, the mechanical chuck is inserted into one of the sheet rollers 710, 720, and upon rotating the inserted mechanical chuck relative to the sheet roller, the inserted mechanical chuck and the sheet roller fixedly couples the mechanical chuck and the sheet roller to one another. In some embodiments, the housing 702 includes at least one locking pawl 708 configured to releasably mate with a latch 808 of the patient repositioning system 800. The locking pawl(s) 708 act to temporarily secure the transfer sheet cartridge 700 to the patient repositioning system housing 802, for example during extension and/or retraction of the transfer sheet 730 from the transfer sheet cartridge 700.

In some embodiments, the present disclosure provides a transfer sheet cartridge 700 comprising: a housing 702; a first transfer sheet roller 710 rotatably associated with the housing; a second transfer sheet roller 720 rotatably associated with the housing; and a transfer sheet 730 associated with the first transfer sheet roller and with the second transfer sheet roller. In some embodiments, the first transfer sheet roller 710 includes at least one roller detent 752*a* configured to mate with a slot 852*a* of a first actuating roller 850*a*. In some embodiments, the second transfer sheet roller 720 includes at least one roller detent 752*b* configured to mate with a slot 852*b* of a second actuating roller 850*b*. In some embodiments, a substantial portion of the transfer sheet 730 is wound around the first transfer sheet roller 710. In some embodiments, the housing 702 comprises at least one locking pawl 708 configured to releasably mate with a latch 808 of a patient repositioning system 800. In some embodiments, a first end of the transfer sheet 730 is coupled to the first transfer sheet roller 710, and wherein a second end of the transfer sheet 730 opposite the first end is coupled to the second transfer sheet roller 720. In some embodiments, the transfer sheet 730 is configured to unwind from the transfer sheet cartridge to form a top layer 734 and a bottom layer 736 beneath the patient and between the patient and the transfer surface. A fold 735 in the sheet may separate the top layer 734 and the bottom layer 736. In some embodiments, the bottom layer 736 of the transfer sheet 730 is configured to slide between the transfer surface and the top layer 734 of the transfer sheet 730.

Referring now specifically to FIGS. 11-31, patient repositioning systems 800 consistent with one embodiment of the present disclosure are configured to receive (e.g., temporarily receive) a transfer sheet cartridge 700 including a transfer sheet 730.

In some embodiments, the patient repositioning system 800 comprises a housing 802 that includes a recess 810 into which the transfer sheet cartridge 700 may be inserted. The recess 810 may include an opening 814 sized and shaped to mate with the housing 702 of the transfer sheet cartridge 700. In some embodiments, the recess 810 includes a stop 812 against which a portion of the transfer sheet cartridge 700 may contact to limit the extent to which the transfer sheet cartridge 700 may be inserted into the recess 810. In some embodiments, the housing 802 includes at least one latch 808 configured to mate with at least one locking pawl 708 of the transfer sheet cartridge 700. The locking pawl(s) 708 and the corresponding latch(es) 808 act in concert to temporarily secure the transfer sheet cartridge 700 to the patient repositioning system housing 802, for example during extension and/or retraction of the transfer sheet 730 from the transfer sheet cartridge 700. The patient repositioning system housing 802 and/or the transfer sheet cartridge housing 702 may include a release 806 configured to disengage the locking pawl(s) 708 from the latch(es) 808 such that the transfer sheet cartridge 700 may be removed from the recess 810. In other embodiments, the transfer sheet cartridge 700 may include a latch while the housing 802 includes a corresponding (e.g., complementary) locking pawl.

The patient repositioning system 800 includes at least one actuator **850*a* configured to mate (e.g., temporarily mate) with the at least one transfer sheet roller 710. In some embodiments, the at least one actuator 850*a* is a roller over which a tubular transfer sheet roller 710 is slid. In some embodiments, the actuator 850*a* includes at least one slot 852*a* configured to mate with at least one roller detent 752*a* of the at least one transfer sheet roller 710. The detent 752*a* and corresponding slot 852*a* may be oriented parallel or substantially parallel with a long axis of the transfer sheet roller 710 such that the transfer sheet cartridge 700 may be easily inserted and removed from the recess 810 while rotation of the actuator 850*a* causes the transfer sheet roller 710 to rotate about the long axis. In some embodiments, the actuator 850*a* includes a plurality of slots 852*a* each configured to mate with a roller detent 752*a* of a transfer sheet roller 710, for example for more convenient alignment of the transfer sheet roller 710 and the actuator 850*a* during insertion of the transfer sheet cartridge 700 into the recess 810**.

In some embodiments, the patient repositioning system 800 further includes a second actuator **850*b* configured to mate (e.g., temporarily mate) with the a second transfer sheet roller 720. In some embodiments, the second actuator 850*b* is a roller over which a tubular transfer sheet roller 720 is slid. In some embodiments, the second actuator 850*b* includes at least one slot 852*b* configured to mate with at least one roller detent 752*b* of the second transfer sheet roller 720. The detent 752*b* and corresponding slot 852*b* may be oriented parallel or substantially parallel with a long axis of the second transfer sheet roller 720 such that the transfer sheet cartridge 700 may be easily inserted and removed from the recess 810 while rotation of the second actuator 850*b* causes the transfer sheet roller 720 to rotate about the long axis. In some embodiments, the second actuator 850*b* includes a plurality of slots 852*b* each configured to mate with a roller detent 752*b* of a second transfer sheet roller 720, for example for more convenient alignment of the second transfer sheet roller 720 and the second actuator 850*b* during insertion of the transfer sheet cartridge 700 into the recess 810**.

The patient repositioning system 800 may include one or more motors 340, **340*a*, 340*b* in operative communication with the actuator(s) 850*a*, 850*b* as previously described to enable one or more of the actuators 850*a*, 850*b*** to rotate upon activation by an electrical signal (e.g., triggered by a user).

Referring now to FIGS. 22-31, a patient repositioning system 800 consistent with the present disclosure may include a gearbox 900 in operative communication with the motor(s) and one or more gears 910 to cause rollers **850*a*, 805*b* to rotate one or more rollers 710, 720 of the cartridge 700. In some embodiments, the gearbox 900 may be in operative communication with one or more lower sheet drive rollers 932, 934. When two lower sheet drive rollers 932, 934 are present, one lower sheet drive roller 932 may be disposed below and in contact with the bottom layer 736 of the transfer sheet 730, while a second lower sheet drive roller 934 may be disposed between the top layer 734 and the bottom layer 736 and in contact with the bottom layer 736 of the transfer sheet 730. Rotation of the two lower sheet drive rollers 932, 934 in opposite directions causes the bottom layer 736 of the transfer sheet to either extend (away from the cartridge 700) or retract (towards the cartridge 700**).

In some embodiments, insertion of the cartridge 700 until the locking pawl(s) 708 and complementary latch(es) 808 mate causes the associated motor(s) to automatically begin extending the transfer sheet 730 from the cartridge 700 (e.g., by causing the actuator(s) **850*a*, 850*b* to rotate via optional gearbox 900). In some embodiments, extending the transfer sheet 730 comprises causing actuator 850*a* to rotate. In other embodiments, extending the transfer sheet 730 comprises causing actuator 850*b*** to rotate.

Activation of the first motor e.g., the only motor or one of a plurality of motors) causes roller 720 and/or roller 710 to rotate via rotation of corresponding actuating roller **850*a* or 850*b*, respectively, and the mating of retention feature 752*a* with corresponding retention feature 852*a*, and/or the mating of retention feature 752*b* and corresponding retention feature 852*b*. Rotation of the roller 720 and/or roller 710 causes the retention sheet 730 to extend from the cartridge 700 and under the patient P. After the patient P is relocated via the transfer sheet 730, the transfer sheet 730 may be retracted into the cartridge 700 by rotation roller 720 and/or roller 710 in a direction counter to the direction of rotation required to extend the transfer sheet 730. After the transfer sheet 730 is retracted into the cartridge 700, the cartridge 700 may be removed from the patient repositioning system 800** and disposed or recycled.

In some embodiments, the present disclosure provides a patient repositioning system 800 for repositioning a patient positioned on a transfer surface, the system comprising: a first actuating roller **850*a*; and a second actuating roller 850*b*; and a housing 802 including a recess 810 configured to receive a transfer sheet cartridge 700. In some embodiments, the patient repositioning system 800 further includes a mechanical actuator 340, such as a motor, coupled to at least the first actuating roller 852***a* and configured to retract the top layer 734 of the transfer sheet 730. In some embodiments, the patient repositioning system 800 further includes a mechanical actuator 340, such as a motor, coupled to at least the second actuating roller 852*b* and configured to retract the bottom layer 736 of the transfer sheet 730. In some embodiments, the first actuator 850*a* and the second actuator 850*b* are both disposed on the same side of the transfer surface.

Referring now specifically to FIGS. 29A-31, the patient repositioning system in some embodiments further includes a transfer sheet insertion assistance module 1000 configured to assist insertion of the transfer sheet 730 beneath the patient P. In some embodiments, the transfer sheet insertion assistance module 1000 includes an insertion member 1010 configured to assist passage of the transfer sheet 730 beneath the patient P. For example and without limitation, in some embodiments the transfer sheet insertion assistance module 1000 is configured to push or force the insertion member 1010 between the top layer 734 of the transfer sheet 730 and the bottom layer 736 of the transfer sheet 730. In some embodiments, the transfer sheet insertion assistance module 1000 causes the insertion member 1010 to extend between the bottom layer 734 and the top layer 736 and, as the insertion member 1010 advances further from the patient repositioning system, forces the transfer sheet 730 beneath the patient P from the side closest to the patient repositioning system to the opposite side of the patient P. In some embodiments, the insertion member 1010 can be made from a variety of materials, including but not limited to a rigid or semi-rigid material, such as plastic, polyethylene, or the like. For example, the insertion member 1010 should be flexible enough to bend (e.g., be rolled) around a core member when in an undeployed position, and rigid enough to be able to push the transfer sheet 730 beneath the patient P when in a deployed position.

In some embodiments, the transfer sheet insertion assistance module 1000 includes a motor (not shown) in operative communication with a gearbox 1050 configured to transfer power from the motor to a spool 1060 on which the insertion member 1010 may be stored when not extended beneath the patient P. Rotation of the spool 1060 in a first direction causes the insertion member 1010 to extend away from the spool 1060 and towards the patient P. Rotation of the spool 1060 in the opposite direction causes the insertion member 1010 to retract away from the patient P and toward the spool 1060. In some embodiments, the insertion member 1010 is coupled to the spool 1060 via one or more mechanical chucks. The mechanical chucks can be, for example, mechanical chucks manufactured by the Converter Accessory Corporation (CAC®), as described above. In some embodiments, the spool 1060 has three segments, each of which is coupled to a mechanical chuck.

While in use, the insertion member 1010 may become soiled. In some embodiments, the patient repositioning system further includes a sanitation system 1040 (e.g., a UV sanitizer) configured to sanitize the insertion member 1010. The sanitation system 1040 decreases the frequency at which the insertion member 1010 must be cleaned or replaced.

In some embodiments, the cartridge 700 is configured to operate with the transfer sheet insertion assistance module 1000 to conveniently pass the transfer sheet 730 beneath a patient P, for example without requiring substantial or any assistance from a clinician. In some such embodiments, the cartridge 700 may be configured to prevent the top roller 710 from rotating or enabling the top layer 734 to extend away from the cartridge 700 while the insertion member 1010 is extending away from the spool 1060. Embodiments consistent with this configuration enable convenient advancement of the transfer sheet 730 beneath a patient P. Without wishing to be bound by theory, the inventor presently believes that such embodiments are especially effective due at least in part because only the bottom layer 736 is required to slide against a surface that is relatively flat (the top surface on which the patient P rests) compared to the uneven surface of the patient P against which the top layer 734 must slide if the top roller 710 were allowed to rotate to advance the top layer 734.

In some embodiments, the insertion member 1010 comprises a plurality of insertion member segments 1030 that joined to each other in a flexible or hinged manner. For example and without limitation, adjacent insertion member segments 1030 may in some embodiments be joined by a relatively thinner portion of material formed by a pair of opposing slits 1044, 1046. In some embodiments, the slits 1044 on a first side 1014 of the insertion member 1010 are relatively shallower than the opposing slits 1046 on the opposite side 1016 of the insertion member 1010. In some embodiments, the insertion member 1010 includes a terminal segment 1030*a* that includes a roller 1020 or rounded leading edge 1018 to reduce resistance of the transfer sheet fold 735 as it slides past the leading edge 1018 of the terminal segment 1030*a*. In some embodiments, the terminal segment 1030*a* includes an extension (not shown) configured to limit the insertion member 1010 from retracting too far onto the spool 1060 when the insertion member 1010 is retracted after the transfer sheet 730 is advanced beneath the patient P.

Each insertion member segment 1030 may have a thickness 1010*t* of about ⅛ inch to about 2 inches, for example about ⅛ inch, about ¼ inch, about ⅜ inch, about ½ inch, about ⅝ inch, about ¾ inch, about ⅞ inch, about 1 inch, about 1.125 inches, about 1.25 inches, about 1.375 inches, about 1.5 inches, about 1.625 inches, about 1.751.875 inches, about or about 2 inches.

Each insertion member segment 1030 may have a width that extends substantially the width 730*w* of the transfer sheet 730. In some embodiments, each insertion member segment 1030 may have a width 1030*w* of about 1 inch to about 5 inches, for example about 1 inch, about 1.5 inches, about 2 inches, about 2.5 inches, about 3 inches, about 3.5 inches, about 4 inches, about 4.5 inches, or about 5 inches.

The insertion member 1010 may be formed of any suitable material that, when extended, provides sufficient rigidity to enhance advancement of the transfer sheet 730 beneath the patient P. In some embodiments, the insertion member 1010 is formed of a moisture-resistant or moisture-proof resin material (e.g., high-density polyethylene) suitable for use in the healthcare environment. In other embodiments, the insertion member 1010 is formed of a metal such as aluminum, steel, or a combination thereof.

In some embodiments, the patient repositioning system includes a transfer sheet insertion assistance module 1000 but does not include lower sheet drive rollers 932, 934.

Figure 32A:
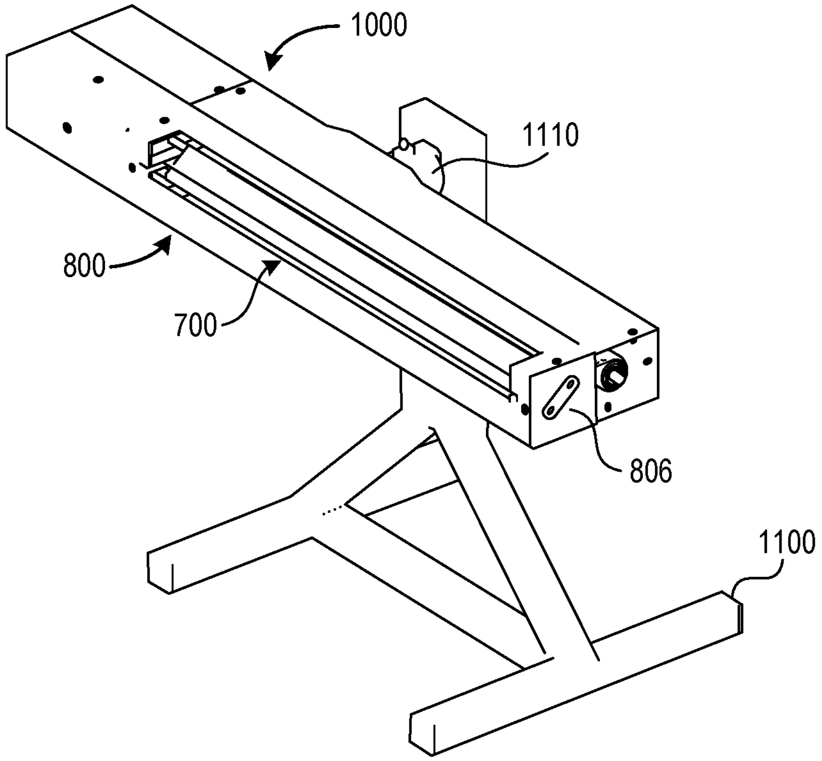
FIG. 32A shows a perspective view of a patient repositioning system rotatably mounted on a stand in an operating position and configured in accordance with embodiments of the present disclosure.
Figure 32B:
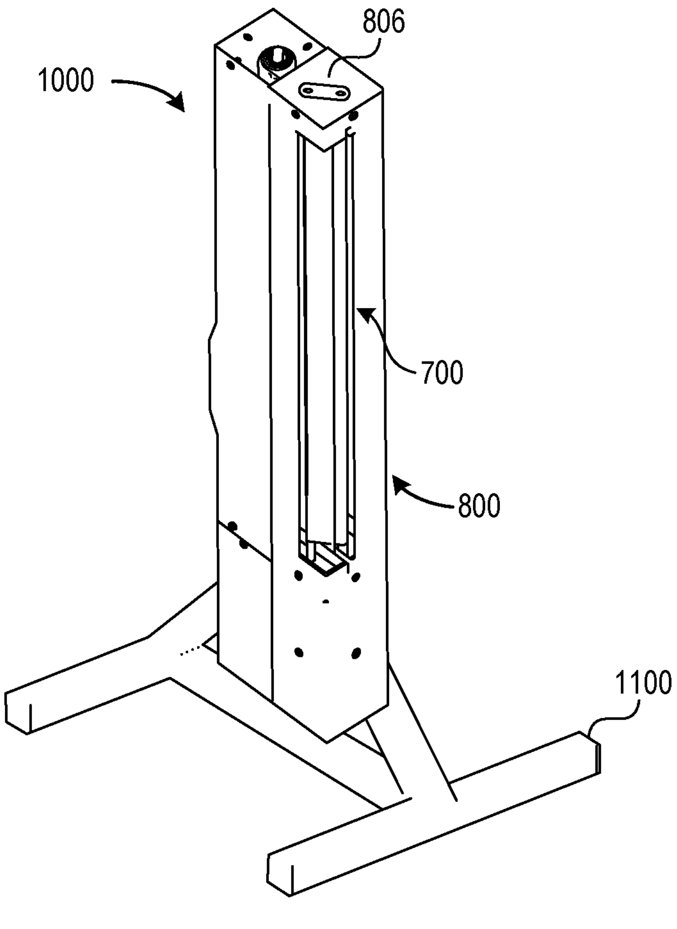
FIG. 32B shows a perspective view of a patient repositioning system rotatably mounted on a stand in a storage position and configured in accordance with embodiments of the present disclosure.

Referring now to FIGS. 32A and 32B together, the transfer sheet cartridge 700, the patient repositioning system 800, and the transfer sheet insertion assistance module 1000 are rotatably coupled to a stand 1100 about a stand pivot 1110. The cartridge 700, the system 800, and the module 1000 are rotatable between an operating position (FIG. 32A) and a storage position (32B). In the operating position, the system 800 and the module 1000 can be oriented substantially horizontally and/or parallel to the surface to or from which the patient is transferred. In the storage position, the system 800 and the module 1000 can be oriented substantially vertically to minimize footprint. The cartridge 700 can be removed from the system 800 upward for cleaning or replacement by actuating the release 806. The cartridge 700 can be removed from the system 800 horizontally for cleaning or replacement by actuating the release 806.

It will be apparent to those having skill in the art that changes may be made to the details of the above-described embodiments without departing from the underlying principles of the present disclosure. In some cases, well known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms “a,” “an,” and “the” include plural referents unless the context clearly indicates otherwise. Additionally, the term “comprising,” “including,” and “having” should be interpreted to mean including at least the recited feature(s) such that any greater number of the same feature and/or additional types of other features are not precluded.

Reference herein to “one embodiment,” “an embodiment,” “some embodiments” or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numbers used in the specification and claims, are to be understood as being modified in all instances by the term “about.” Accordingly, unless indicated to the contrary, the numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of “1 to 10” includes any and all subranges between (and including) the minimum value of 1 and the maximum value of 10, i.e., any and all subranges having a minimum value of equal to or greater than 1 and a maximum value of equal to or less than 10, e.g., 5.5 to 10.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

I claim:

1. A portable system for repositioning a patient, the system comprising:
- a first housing;
- a cartridge removably coupled to the first housing, the cartridge comprising:
  - a first roller rotatably mounted along a first axis; and
  - a second roller rotatably mounted along a second axis parallel to the first axis,
  - wherein the first roller is configured to rotate independent of the second roller;
- a transfer sheet including a first end portion coupled to the first roller and a second end portion coupled to the second roller, wherein the transfer sheet has a fold defining a top layer between the fold and the first end portion and a bottom layer between the fold and the second end portion;
- a second housing; and
- an insertion member rotatably coupled to the second housing and insertable between the top layer and the bottom layer, the insertion member having a terminal segment, the terminal segment configured to be positioned at the fold and wherein the transfer sheet is slidable about the terminal segment.

2. The system of claim 1, wherein the second housing further includes a UV sanitizer configured to sanitize the insertion member.

3. A method of repositioning a patient, comprising:
- providing a transfer sheet with a first end portion coupled to a first roller and a second end portion coupled to a second roller, wherein the transfer sheet has a fold defining a top layer between the fold and the first end portion and a bottom layer between the fold and the second end portion, and wherein the first roller is vertically spaced apart from the second roller;
- rotating the second roller such that the bottom layer slides beneath the top layer in a direction away from the second roller;
- rotating the first roller such that the top layer slides over the bottom layer in a direction towards the first roller; and
- rotating a spool coupled to an insertion member such that the insertion member is inserted between the top layer and the bottom layer.

4. The method of claim 3, further comprising:
- rotating the second roller such that the bottom layer slides beneath the top layer in a direction towards the second roller; and
- rotating the spool such that the insertion member is removed from between the top layer and the bottom layer to retract the transfer sheet.

5. The method of claim 3, wherein the first roller and the second roller are part of a cartridge, the method further comprising:
- coupling the cartridge to a housing including a first actuator and a second actuator;

rotating the first actuator to rotate the first roller; and
rotating the second actuator to rotate the second roller.

6. The method of claim 3, further comprising:

rotating a first lower sheet drive roller disposed between the top and bottom layers and contacting a first side of the bottom layer in a first direction; and rotating a second lower sheet drive roller contacting a second side opposite the first side of the bottom layer in a second direction opposite the first direction, wherein rotating the first and second lower sheet drive rollers moves the bottom layer of the transfer sheet toward or away from the second roller.

7. The method of claim 3, wherein the first and second rollers are at least partially contained within a housing, the method further comprising:

moving a stand coupled to the housing to a location adjacent a transfer surface; and pivoting the housing from a storage position to an operating position, such that the housing is parallel to the transfer surface.

8. The method of claim 3, further comprising:

inflating one or more inflatable chambers to selectively lift and/or reposition the patient.

9. An assembly for repositioning a patient, the assembly comprising:

a housing;

a cartridge removably coupled to the housing, wherein the cartridge includes a first roller rotatably mounted along a first axis and a second roller rotatably mounted along a second axis parallel to the first axis;

a first detent disposed on an interior surface of the first roller;

a second detent disposed on an interior surface of the second roller;

a transfer sheet including a first end portion coupled to the first roller and a second end portion coupled to the second roller, wherein the transfer sheet has a fold defining a top layer between the fold and the first end portion and a bottom layer between the fold and the second end portion;

a first actuating roller coupled to the first roller;

a second actuating roller coupled to the second roller;

a first slot disposed on the first actuating roller, wherein the first detent is mated with the first slot; and a second slot disposed on the second actuating roller, wherein the second detent is mated with the second slot.

10. The assembly of claim 9, further comprising:

a motor coupled to at least one of the first actuating roller or the second actuating roller, wherein the motor is configured to rotate at least one of the first actuating roller or the second actuating roller, thereby rotating at least one of the first roller or the second roller.

* * * * *